United States Patent
Schreiner et al.

(10) Patent No.: US 12,526,471 B2
(45) Date of Patent: Jan. 13, 2026

(54) METHODS, APPARATUS AND SYSTEMS FOR SIGNALING PRESELECTIONS

(71) Applicant: Dolby International AB, Dublin (IE)

(72) Inventors: Stephan Schreiner, Birgland (DE); Jan Mueller, Fürth (DE); Wolfgang A. Schildbach, Nuremberg (DE)

(73) Assignee: Dolby International AB, Dublin (IE)

( * ) Notice: Subject to any disclaimer, the term of this patent is extended or adjusted under 35 U.S.C. 154(b) by 161 days.

(21) Appl. No.: 18/571,608

(22) PCT Filed: Jun. 28, 2022

(86) PCT No.: PCT/EP2022/067668
§ 371 (c)(1),
(2) Date: Dec. 18, 2023

(87) PCT Pub. No.: WO2023/275013
PCT Pub. Date: Jan. 5, 2023

(65) Prior Publication Data
US 2024/0284000 A1    Aug. 22, 2024

Related U.S. Application Data

(60) Provisional application No. 63/297,473, filed on Jan. 7, 2022, provisional application No. 63/216,029, filed on Jun. 29, 2021.

(51) Int. Cl.
*H04N 21/434*    (2011.01)
*H04N 21/44*    (2011.01)
*H04N 21/854*    (2011.01)

(52) U.S. Cl.
CPC ... *H04N 21/4343* (2013.01); *H04N 21/44008* (2013.01); *H04N 21/85406* (2013.01)

(58) Field of Classification Search
CPC ......... H04N 21/4343; H04N 21/44008; H04N 21/85406
See application file for complete search history.

(56) References Cited

U.S. PATENT DOCUMENTS 9,854,375 B2   12/2017   Stockhammer
10,536,721 B2   1/2020   Wang
(Continued)

FOREIGN PATENT DOCUMENTS

CN       105052167 B    10/2018
JP       2022522388 A    4/2022
(Continued)

OTHER PUBLICATIONS

DASH Industry Forum, "Audio Amendment to Guidelines for Implementation: DASH-IF Interoperability Points, Version 4.3 ", Jul. 24, 2020, 37 pages.

(Continued)

*Primary Examiner* — Randy A Flynn

(57) ABSTRACT

Described is a method of processing a media stream. The method comprises receiving the media stream packetized in accordance with a predefined transport format, wherein the packetized media stream comprises a plurality of hierarchical boxes each being associated with a respective box type identifier, and wherein the plurality of boxes comprise one or more track boxes referencing respective tracks indicative of media components of the media stream; determining whether the media stream comprises a preselection-related box of predefined type indicative of a preselection, wherein the preselection corresponds to a media presentation to a user; and if it is determined that the media stream comprises the preselection-related box: analyzing metadata information corresponding to the preselection-related box, the metadata information being indicative of characteristics of the preselection; identifying one or more tracks in the pack- (Continued)

etized media stream contributing to the preselection based on the metadata information; and providing the one or more tracks for downstream processing in accordance with the given preselection.

22 Claims, 7 Drawing Sheets

(56) References Cited

U.S. PATENT DOCUMENTS

| | | | |
|---|---|---|---|
| 10,587,883 | B2 | 3/2020 | Wang |
| 10,951,871 | B2 | 3/2021 | Takahashi |
| 2020/0244942 | A1 | 7/2020 | Maze |
| 2020/0245041 | A1 | 7/2020 | Maze |
| 2020/0260063 | A1* | 8/2020 | Hannuksela ... H04N 21/234345 |
| 2020/0286283 | A1 | 9/2020 | Takahashi |
| 2020/0296397 | A1 | 9/2020 | Wang |
| 2020/0389676 | A1 | 12/2020 | Denoual |
| 2021/0021909 | A1* | 1/2021 | Wang ............... H04N 21/85406 |
| 2021/0152808 | A1 | 5/2021 | He |
| 2023/0362415 | A1 | 11/2023 | Wang |

FOREIGN PATENT DOCUMENTS

| | | |
|---|---|---|
| RU | 2477883 C2 | 3/2013 |
| RU | 2681086 C1 | 3/2019 |
| RU | 2689140 C1 | 5/2019 |
| RU | 2719368 C2 | 4/2020 |
| WO | 2017029400 A1 | 2/2017 |
| WO | 2020141259 A2 | 7/2020 |
| WO | 2020182524 A1 | 9/2020 |
| WO | 2021058814 A1 | 4/2021 |
| WO | 2021099363 A2 | 5/2021 |
| WO | 2021102953 A1 | 6/2021 |
| WO | 2021109412 A1 | 6/2021 |
| WO | 2021136877 A1 | 7/2021 |

OTHER PUBLICATIONS

ETSI TS 103190-2, Digital Audio Compression (AC-4) Standard Part 2: Immersive and personalized audio. 205 pages.
ISO/IEC 14496-12: "Information technology—Coding of audiovisual objects—Part 12: ISO base media file format" 248 pges.
ISO/IEC 23008-3: Information technology—High efficiency coding and media delivery in heterogeneous environments. 15 pages.
ISO/IEC 23009-1:Information technology—Dynamic adaptive streaming over HTTP (DASH)—Part 1: Media presentation description and segment formats ("MPEG-DASH") 236 pages.
ISO/IEC 23090-3-Information technology—Coded representation of immersive media. 604 pages.
Jon Piesing: "DASH Specification V2", DVB, Digital Video Broadcasting, C/O EBU—17A Ancienne Route—CH-1218 Grand Saconnex, Geneva—Switzerland No. r7 Sep. 11, 2017 (Sep. 11, 2017), XP017854541, 107 pages. Retrieved from the Internet: URL:(Old): https://www.dvb.org/resources/restricted/members/documents/ TM-IPI/ TM-IPI3258r7 DASH-Specification-.
Michael Dolan: "[6] Signaling of Preselections in ISOBMFF", 135. MPEG Meeting; Jul. 12, 2021-Jul. 16, 2021; Online; (Motion Picture Expert Group or ISO/IEC JTC1/SC29/WG11 ), No. m57314 Jul. 5, 2021 (Jul. 5, 2021), XP030296849, 11 pages. Retrieved from the Internet.
Stephan Schreiner et al: "[ISOBMFF] Signaling of Preselections in ISOBMFF", 137. MPEG Meeting; Jan. 17, 2022-Jan. 21, 2022; Online; (Motion Picture Expert Group or ISO/IEC JTC1/SC29/ WG11 ), No. m58901 Jan. 12, 2022 (Jan. 12, 2022), XP030299637, 14 pages. Retrieved from the Internet: URL:https://dms.mpeg.expert/ doc_end_user/documents/137 Online/wg11 / m58901-v1-m58901_ ISOBMFF.
Stephan Schreiner et al: "[ISOBMFF] Signaling of Preselections in ISOBMFF", 137. MPEG Meeting; Jan. 17, 2022-Jan. 21, 2022; Online; (Motion Picture Expert Group or ISO/IEC JTC1/SC29/ WG11 ), No. m58901 Jan. 19, 2022 (Jan. 19, 2022), XP030299638, 31 pages. Retrieved from the Internet: URL:https://dms.mpeg.expert/ doc_end_user/documents/137 _Online/wg11 /m58901-v2-m58901 _ISOBMFF.
Stephan Schreiner et al: "Signaling of Preselections in ISOBMFF", 136. MPEG Meeting; Oct. 11, 2021-Oct. 15, 2021; Online; (Motion Picture Expert Group or ISO/IEC JTC1/SC29/WG11 ), No. m58088 Oct. 6, 2021 (Oct. 6, 2021), XP030298790, 12 pages. Retrieved from the Internet: URL:https://dms.mpeg.expert/doc_end_user/ documents/136_Online/wg11 / m58088-v1 -m58088-ISOBM FF-.
Y-K Wang (Bytedance): "[5.1 ][ISOBMFF] Signalling of preselection information", 138. MPEG Meeting; Apr. 25, 2022-Apr. 29, 2022; Online; (Motion Picture Expert Group or ISO/IEC JTC1/ SC29/WG11 ), No. m59366 Apr. 15, 2022 (Apr. 15, 2022), XP030301563, 4 pages. Retrieved from the Internet: URL:https:// dms.mpeg.expert/doc_end_user/documents/138_Online/wg11 /m59366- v1 -m59366-v1.
Y-K Wang (Bytedance): "[6.1 ][ISOBMFF] On preselection signalling in ISOBMFF", 137. MPEG MEETING; Jan. 17, 2022-Jan. 21, 2022; Online; (Motion Picture Expert Group or ISO/IEC JTC1/ SC29/WG11 ), No. m58904 Jan. 12, 2022 (Jan. 12, 2022), XP030299641, 6 pages. Retrieved from the Internet: URL:https:// dms.mpeg.expert/doc_end_user/documents/137 Online/wg11 /m58904- v1 -m58904-v1 _preselectionin.
Samsung, Working draft of amendment to ISO/IEC 14496-12:2021 CDAM1 Improved brand documentation and other improvements [online] , ISO/IEC JTC 1/SC 29/WG 03 , Nov. 5, 2021, 26 pages.

* cited by examiner

METHODS, APPARATUS AND SYSTEMS FOR SIGNALING PRESELECTIONS

CROSS-REFERENCE TO RELATED APPLICATIONS

This application is the U.S. national stage entry of International Patent Application No. PCT/EP2022/067668, filed Jun. 28, 2022, which claims priority of the following priority applications: U.S. provisional application 63/216,029 filed Jun. 29, 2021 and U.S. provisional application 63/297,473 filed Jan. 7, 2022, which are hereby incorporated by reference.

TECHNICAL FIELD

The present disclosure is directed to the general area of audio and/or video coding (encoding/decoding), and more particularly, to methods, apparatuses and systems for signaling preselections corresponding to media presentations to a user, and the processing thereof.

BACKGROUND

Generally speaking, with the advent of Next-Generation Audio (NGA) or similar video technologies, the overall audio experience is no longer transmitted as a pre-generated single-instance media component. Rather, individual semantic objects can be each provided separately to offer end users an efficient way to tailor content to their preferences.

For example, dialog may be provided in multiple languages, as additional selectable audio components and language selection can be implemented by combining different audio components or through different balances between components.

In a broad sense, modern video compression schemes may generally utilize the possibility to span the overall available media data over several streams for different reasons including the possibility to save transmission bandwidth for those users not demanding certain portions of the media asset.

In any case, media players would typically rely on accompanying metadata for guidance on how to render the components to yield pre-defined user experiences, as can be understood and appreciated by the skilled person.

For transmission, multiple of these content components (or CCs for short) may be multiplexed into one single elementary stream or these components can be spread over multiple elementary streams.

Typically, not all available components should be presented simultaneously, but only certain combinations of these components may provide the desired user experiences.

Metadata in various multiplexing and transport layers provides clients (or end users) the required knowledge about all available components. In addition, this data might also be needed to decide which elementary streams are to be downloaded and decoded, in some cases.

The International Organization for Standardization (ISO) includes and specifies a Base Media File format, generally known as ISOBMFF. In particular, this ISOBMFF is specified by ISO/IEC 14496-12 MPEG-4 Part 12 by the ISO. Generally speaking, it defines a general structure for time-based multimedia files such as video and/or audio. While most existing multiplex formats may already provide means to annotate components within files with their respective properties, the ISO Base Media File Format (ISOBMFF) multiplex seem to somewhat lack the ability to signal the overall experience made up of combinations of the content components. In short, there seems to exist a gap compared to some other standards (e.g., MPEG-DASH (ISO/IEC 23009-1)) that appear to have introduced the concept of Preselections.

In view thereof, generally speaking, there appears to exist a need for techniques of signaling information indicative of such preselections (possibly also information indicative of how such preselections are to be processed) to the users, more particularly within the context of ISOBMFF.

SUMMARY

In view of the above, the present disclosure generally provides methods of processing a media stream, a media stream processing apparatus, a program, as well as a computer-readable storage media, having the features of the respective independent claims.

According to a first aspect of the present disclosure, a method of processing a media stream is provided. The media stream may be an audio stream, a video stream, or a combination thereof. The method may be performed on a user side, or in some cases, in a user (decoding) side environment, which may include, but is not limited to, a TV, a soundbar, a web browser, a media play, a plugin, etc., depending on various implementations.

In particular, the method may comprise receiving the media stream packetized in accordance with a predefined transport format. The predefined transport format may be the Base Media File Format (ISOBMFF) as specified by ISO/IEC 14496-12 MPEG-4 Part 12 by the ISO, or in any other suitable (transport) format. The packetized media stream may comprise a plurality of hierarchical boxes each being associated with a respective box type identifier. Notably, as used herein, the term "box" may generally be used to refer to, in some possible cases, an object-oriented building block defined by a unique (box) type identifier (and possibly also a respective length) for example as described in ISO 14496-12. Of course, the term "box" as used throughout the present disclosure shall not be understood to be limited to such specification only. Rather, the term "box" shall be generally understood as any suitable data structure that may serve as a placeholder for the media data or other data of the packetized media stream. Furthermore, as will also be understood and appreciated by the skilled person, such "box" may be referred to by using any other suitable term. An example may be that in some possible specifications (including the first definition of MP4), the "box" may alternatively be called an "atom" in certain cases. Further, as indicated ("hierarchical"), the plurality of boxes may, depending on various implementations and/or requirements, be of the same or different levels (or positions), nested (child/sub box vs. parent box), etc., as will be understood and appreciated by the skilled person. More particularly, the plurality of boxes may comprise, among other possibilities, one or more track boxes referencing (or in other words, indicating) respective tracks indicative of media (content) components of the media stream. Broadly speaking, a media (content) component may generally refer to a single/individual continuous component of the media content (and, may typically be also associated with a corresponding (e.g., assigned) media content component type, which may include, but is not limited to audio, video, text, etc.). An example for understanding the concept of the "media (content) component" may be found as defined/described for example in MPEG-DASH (ISO/IEC 23009-1).

The method may further comprise determining whether the media stream comprises a preselection-related box of a predefined type indicative of a preselection, wherein the preselection may correspond to a media presentation to a user. To be more specific, as used herein, the term/phrase "preselection" is generally used to refer to a set of media content components (of the media stream) that is intended to be consumed jointly (e.g., by a user-side device), and more particularly, that generally represents one version of the media presentation that may be selected by the end-user for simultaneous decoding and/or presentation. An example for understanding the concept of the "preselection" may be found as described in for example MPEG-DASH (ISO/IEC 23009-1). Of course, as will be understood and appreciated by the skilled person, in some other possible technical contexts, the term "preselection" may also be known (or be referred to) by using any other suitable (comparable) term, such as (but not limited to) "presentation" as described in for example ETSI TS 103190-2, or "preset" as described in for example ISO/IEC 23008-3, etc. Accordingly, the preselection-related box may be a specific box among the plurality of boxes in the media stream that is of a specific predefined (or predetermined) type. Such specific type indicative of the preselection may be predefined (or predetermined) in advance by using any suitable means, as will be understood and appreciated by the skilled person, which will be described in more detail below.

If it is determined that the media stream comprises the preselection-related box, the method may yet further comprise: analyzing metadata information corresponding to the preselection-related box, the metadata information being indicative of characteristics of the preselection; identifying one or more tracks in the packetized media stream contributing to the preselection based on the metadata information; and providing the one or more tracks for downstream processing in accordance with the given preselection. As will be understood and appreciated by the skilled person, the metadata information illustrated above may be (directly) included in or (indirectly) derivable from the media stream (or more specifically, the plurality of boxes of the (packetized) media stream) by using any suitable means, depending on various implementations. For instance, the metadata information may be comprised or included in a header box (or a sub-box of another box) that may be associated with or linked to the preselection-related box (e.g., as a sub-box thereof). As noted above, the preselection generally refers to the case where a set of media content components is intended to be consumed jointly, for example by one or more suitable downstream devices (e.g., a media decoder, a media player, etc.). The downstream device may also be referred to simply as a "sink" in some possible cases. In consequence, depending on various implementations and/or requirements, the downstream processing may comprise, but is certainly not limited to, multiplexing (or re-multiplexing in some possible cases), ordering, merging, decoding, or rendering those contributing tracks, as will be described in more detail below.

Configured as described above, the proposed method may generally provide an efficient yet flexible manner for determining/identifying and subsequently signaling tracks within a media stream that are configured to contribute to a specific preselection, thereby enabling further suitable downstream processing of such contributing tracks (e.g., by one or more suitable downstream devices). As such, broadly speaking, the proposed method may be seen to offer the possibility and capability of signaling information indicative of preselections (and possibly also the processing thereof) in a transport layer file (e.g., the ISOBMFF), in a unified manner, which may be considered beneficial in various use cases or scenarios. For instance, such unified representation (or in other words, format/type-agnostic) of preselections may be used for implementing a unified data structure for a media play application programming interface (API) (e.g., to be used by an application or as a plugin for a web browser), such that no format-specific implementation in the media players would be required, thereby resulting in less effort for implementation and/or testing, while at the same time with increased reliability. As another example, such unified representation of preselections may also enable format agnostic implementation of preselection data handling in manifest (e.g., a MPEG Dynamic Adaptive Streaming over HTTP (DASH) format file, or an HTTP Live Stream (HLS) format file) generators, thereby avoiding the need for computational more expensive operations on binary data, and again with reduced implementation effort and increased reliability. As used herein, the term format/type-agnostic may generally mean that the proposed representation is generic for all data types (formats).

In some example implementations, the media stream may further comprise processing information indicative of how tracks contributing to the preselection are to be processed (e.g., by the downstream device(s)). Similar to the metadata information as described above, the processing information may also be (directly) included in or (indirectly) derivable from the media stream (or more particularly, the plurality of boxes of the (packetized) media stream) by using any suitable means, depending on various implementations. For instance, the processing information may also be comprised in one specific box (for example, of a specific (predefined) type) that may be associated or linked to the preselection or the preselection-related box (e.g., as a sub-box thereof).

In some example implementations, the processing information may comprise ordering information indicative of a track order for processing (e.g., decoding, merging, etc.) the one or more tracks. For instance, in some possible cases, the track order may be indicative of in which order the tracks are to be provided to the downstream devices (e.g., decoding devices). Similar to above, such ordering information may be implemented as being included in a (sub-)box that is associated or linked with the processing information.

In some example implementations, the processing information may comprise merging information indicative of whether one or more tracks are to be merged with one or more other tracks for joint (downstream) processing. That is to say, depending on the implementation of such merging information, in some cases, some track(s) may be merged with some other track(s) for the downstream processing; whist in some other cases, some track(s) may be treated separately (e.g., being routed to individual decoding instances). Notably, in some possible cases, such merging may also be referred to as multiplexing, or any other suitable term. As will be understood and appreciated by the skilled person, the merging (multiplexing) of tracks may be achieved by using any suitable means (e.g., by appending a subsequent track to the end of a preceding track).

In some example implementations, the method may further comprise merging the one or more tracks in accordance with the merging information and the ordering information.

In some example implementations, the ordering information may comprise, for each track contributing to the preselection, a respective track order value for defining the track order of the tracks. As will be understood and appreciated by the skilled person, various suitable rules may be determined for defining the track order of the tracks by using the respective track order value. As noted above, in some possible cases, the track order may be indicative of in which order the tracks are to be provided to the downstream devices (e.g., decoding devices). In such cases, a possible exemplary implementation (but not as a limitation of any kind) may be that a track with a smaller track order value (e.g., 1) would be provided to a decoding device earlier than another track with a larger track order value (e.g., 3). In some cases, if multiple tracks have the same value order value, then the ordering of those tracks may be not relevant or important anymore. Further, in a similar manner, the merging information may comprise a respective merge flag for each track contributing to the preselection. In particular, a first setting value (e.g., '1') of the merge flag may indicate that the respective track is to be merged (or multiplexed) with an adjoining track (e.g., a preceding or a subsequent track, depending on various implementations of such merge flag) in the track order, and a second setting value (e.g., '0') of the merge flag may correspondingly indicate that the respective track is to be processed separately (e.g., being fed or routed into a separate downstream decoding device). As such, merging the one or more tracks in accordance with the merging information and the ordering information may comprise successively (or sequentially) scanning the tracks in accordance with the track order; and merging tracks in accordance with respective merge flags. For instance, in some possible cases, if the merge flag flag [i] of a track i is set to '1', each sample of this track i may be appended to the sample(s) of the track with next lower (or higher) track order value (e.g., track i−1 or i+1); while on the other hand, if the merge flag of a track is set to '0', this track i may be provided to a separate decoder instance. As another possible example in an extreme case where all merge flags for the tracks are set to '0', applying the notion above, all the track would then be distributed to several (separate) downstream devices (sinks).

In some example implementations, the method may further comprise decoding the one or more tracks for playback of the media stream according to the media presentation indicated by the preselection.

In some example implementations, the one or more tracks may be decoded by a downstream device (e.g., a media player, a TV, a soundbar, a plugin, etc.).

In some example implementations, merging the one or more tracks and decoding the one or more tracks may be performed by one single device. Put differently, there may be a use case where merging and decoding work in tandem. To be more specific, an example (but not as a limitation) of such a use case may be one where a certain JavaScript API expects to only work with a single merged stream, but not with multiple streams. In such a case, one entity may generally take multiple incoming streams and merge/multiplex them as illustrated above, and subsequently send them as one merged stream over the single-stream API for decoding on the other side of the API. In some possible cases, the single-stream format may be a Common Media Application Format (CMAF) byte stream format. Of course, as will be understood and appreciated by the skilled person, in some other cases, the merging and the decoding of the tracks may be performed by different (separate) devices. As an illustrative example (but not as a limitation), a TV might be implementing the merging of the stream as illustrated above, but send the merged stream to a separate downstream device like a soundbar for subsequent decoding.

In some example implementations, the media stream may comprise a plurality of (instead of only one) preselection-related boxes of the predefined type. Accordingly, the method may further comprise selecting (or determining) the preselection-related box among the plurality of preselection-related boxes. As will be understood and appreciated by the skilled person, such selection (or determination) of one specific preselection-related box among the plurality of preselection-related boxes may be performed in any suitable means.

In some example implementations, the preselection-related box may be selected (or determined) by an application (e.g., an application in control of a media player/decoder). For instance, in some possible cases, said application may be configured (e.g., based on a predefined algorithm) to (automatically) select (or determine) a preselection-related box, e.g., corresponding to a specific setup (e.g., of the decoding or presentation environment).

In some example implementations, the media stream may comprise one or more label boxes (that may be somehow associated or linked with respective preselections or respective preselection-related boxes) each comprising descriptive information for a respective media presentation to the user corresponding to a respective preselection. Accordingly, in such cases, the selection (or determination) of the preselection-related box may be performed based on an input of the user. As an example (but not as a limitation), the label boxes may comprise descriptive information indicative selectable subtitles of various languages (e.g., English, German, Chinese, etc.) each of which may be considered as a respective preselection (presentation), such that the user (e.g., in control of an application) may select (e.g., by clicking the mouse or keyboard) a corresponding language setting as appropriate.

In some example implementations, the preselection-related box may be considered as agnostic to a media codec used for encoding the media stream before being packetized. That is to say, generally speaking, the preselection-related box may only comprise necessary information for the respective preselection, but not information that may be linked to the media codec (i.e., codec-specific information). In other words, in the preselection-related box(es), there would generally be no information that relates to how the media stream had been encoded (e.g., by a specific media encoder) and/or to how such media stream should be decoded (e.g., by a specific media decoder).

In some example implementations, the metadata information corresponding to the preselection-related box may comprise track identification information indicative of one or more track identifiers each being associated with a respective track, wherein tracks associated with the one or more track identifiers in the metadata information may relate to the media presentation. As will be understood and appreciated by the skilled person, such track identification information indicative of one or more track identifiers may be implemented in any suitable means, e.g., as simple as an array with each element therein being (uniquely) indicative of a respective track identifier (which itself may be represented by using an integer value or any other suitable form). In that case, in some possible cases, the metadata information corresponding to the preselection-related box may optionally further comprise a counter (e.g., an integer value) indicative of the number of tracks required by (or contributing to) that preselection.

In some example implementations, the metadata information corresponding to the preselection-related box may comprise preselection identification information indicative of a preselection identifier for identifying the preselection. That is, the metadata information corresponding to the preselection-related box may comprise necessary information (e.g., represented by using an integer) that enables a preselection to be (uniquely) identifiable toward external (e.g., downstream) applications and/or devices, for example for assisting the selection/determination of the respective preselection accordingly.

In some example implementations, the metadata information corresponding to the preselection-related box may comprise unique preselection-specific data for configuring a downstream device (e.g., a downstream media player/decoder) for decoding the tracks in accordance with the preselection. Depending on various implementations and/or requirements, such preselection-specific data may comprise any suitable information (e.g., in some cases, codec-specific information) and may be implemented (represented) in any suitable means (e.g., integers, arrays, strings, etc.).

According to a second aspect of the present disclosure, a method of processing a media stream is provided. The media stream may be an audio stream, a video stream, or a combination thereof. The method may be performed on a user side, or in some cases, in a user (decoding) side environment, which may include, but is not limited to, a TV, a soundbar, a web browser, a media play, a plugin, etc., depending on various implementations.

In particular, the method may comprise receiving the media stream packetized in accordance with a predefined transport format. Similar to the preceding first aspect, the predefined transport format may be the Base Media File Format (ISOBMFF) as specified by ISO/IEC 14496-12 MPEG-4 Part 12 by the ISO, or in any other suitable (transport) format. The packetized media stream may comprise a plurality of hierarchical boxes each being associated with a respective box type identifier. As illustrated above, the plurality of boxes (or being referred to by using any other suitable terms) may be, depending on various implementations and/or requirements, of the same or different levels (or positions), nested (child/sub box vs. parent box), etc., as will be understood and appreciated by the skilled person. More particularly, the plurality of boxes may comprise, among other possibilities, one or more track boxes referencing (or in other words, indicating) respective tracks indicative of media (content) components of the media stream. In addition, the plurality of boxes may also comprise one or more track group boxes (or being referred to by using any other suitable term/name) each being associated with a respective pair of a track group identifier and a track group type that jointly identify a respective track group within the media stream. That is to say, the tracks that have (e.g., being identified by or associated with) the same track group identifier and the same track group type may be considered to belong to the same track group. Each such track group may generally determine a respective preselection corresponding to a respective media presentation to a user. As illustrated above already, the term/phrase preselection (or being referred to by using any other suitable terms/names) is generally used to refer to a set of media content components (of the media stream) that is intended to be consumed jointly (e.g., by a user-side device), and more particularly, that generally represents one version of the media presentation that may be selected by the end-user for simultaneous decoding/presentation.

The method may further comprise checking (e.g., visiting, cycling through, etc.) the track boxes in the media stream to determine a full (or complete/total) set of preselections that are present in the media stream. In particular, the determination of the full set of preselections may comprise: determining a set of unique pairs of track group identifiers and track group types, and addressing the preselections by respective track group identifiers. As noted above, each preselection is associated with a respective track group, which itself, in turn, is identified by a respective pair of a corresponding track group identifier and a corresponding track group type. Thus, the preselections may be addressed (or identified) by the respective track group identifiers associated/linked therewith.

The method may yet further comprise selecting a preselection among the full set of preselections. In particular, the preselection may be selected based on attributes (e.g., represented as metadata or any other suitable form) of the respective preselection that are included in track group boxes with the same track group identifier.

The method may also comprise determining (e.g., identifying) a set of one or more track boxes contributing to the selected preselection. In particular, the set of one or more track boxes contributing to the (same) preselection may be determined (identified) by the presence of a (respective) track group box with the same track group identifier.

Moreover, the method may further comprise determining, as one or more tracks contributing to the preselection, tracks that are referenced in each member (element) of the set of one or more track boxes as determined above.

Finally, the method may comprise providing the one or more tracks for downstream processing in accordance with the preselection. As noted above, the preselection generally refers to a set of media content components that are intended to be consumed jointly, for example by one or more suitable downstream devices (or in some possible cases, referred to sinks), such as a media decoder, a media player, etc. In consequence, depending on various implementations and/or requirements, the downstream processing may comprise, but is not limited to, multiplexing (or re-multiplexing in some possible cases), ordering, merging, decoding, or rendering those contributing tracks, as will be described in more details below.

Configured as described above, the proposed method may generally provide an efficient yet flexible manner for determining/identifying and subsequently signaling tracks within a media stream that are configured to contribute to a specific preselection, thereby enabling further suitable downstream processing of such contributing tracks (e.g., by one or more downstream devices). Particularly, it is to be noted that the method as proposed above in the first aspect generally seeks to provide the relevant information for (all) the tracks that are configured to contribute to a specific preselection in the preselection-related box, thereby enabling the indexing (or identification) of all contributing tracks. In this sense, such indexing of the tracks as described in the first aspect may be seen as some sort of forward (direct) indexing. In contrast, in the method as proposed in the present second aspect, tracks contributing to a specific preselection may be jointly determined by the pair of track group type and track group identifier. More specifically, tracks that have (e.g., contain) a track group box with a particular (e.g., predefined or predetermined) track group type may generally indicate that said tracks contribute to preselections. Further, tracks that have the same track group identifier may generally indicate that those tracks belong (contributing) to the same preselection. In this sense, opposing to that as proposed in the first aspect, such indexing of the tracks as described here may be seen as some sort of reverse indexing. In any case, similar to the first aspect, the method proposed in the second aspect may also offer the possibility and capability of signaling information indicative of preselections (and possibly the processing thereof) in a transport layer file (e.g., the ISOBMFF), in a unified manner, which may be considered beneficial in various use cases or scenarios. For instance, such unified representation (or in other words, format-agnostic) of preselections may be used for implementing a unified data structure for a media play API (e.g., to be used by an application or as a plugin for a web browser), such that no format-specific implementation in the media players would be required, thereby resulting in less effort for implementation and/or testing, while at the same time with increased reliability. As another example, such unified representation of preselections may also enable format-agnostic implementation of preselection data handling in manifest (e.g., a MPEG Dynamic Adaptive Streaming over HTTP, DASH, format file, or an HTTP Live Stream, HLS, format file) generators, thereby avoiding the need for computational more expensive operations on binary data, and again with reduced implementation effort and increased reliability.

In some example implementations, each preselection may be associated with a respective preselection-related box of a predefined type. In particular, the preselection-related box may instantiate (e.g., inherent, extend, etc.) a track group box with a predefined track group type relating to preselection. Such predefined track group type relating to preselection may be implemented by using any suitable means, such as a specific (predefined) string (e.g., 'preselection' or 'pres'), a specific (predefined) value (e.g., '3'), or the like, as will be understood and appreciated by the skilled person. Generally speaking, in the method as proposed in the second aspect, there would generally be one such preselection-related box per preselection and per track that corresponds (contributes) to that preselection. As a comparison, in the method as proposed in the preceding first aspect, there would generally be one such preselection-related box per preselection.

In some example implementations, the preselection-related box may be associated with a preselection processing box comprising processing information indicative of how tracks contributing to the preselection are to be processed. The processing information may be (directly) included in or (indirectly) derivable from the media stream (or more particularly, the plurality of boxes of the (packetized) media stream) by using any suitable means, depending on various implementations. For instance, the processing information may also be comprised in a specific box (for example, of a specific (predefined) type) that may be associated or linked to the preselection or the preselection-related box (e.g., as a sub-box thereof).

In some example implementations, the preselection-related box may be associated with a preselection information box comprising semantic (or descriptive) information indicative of (e.g., attributes, characteristics, etc.) the preselection.

In some example implementations, the processing information may comprise unique preselection-specific data for configuring a downstream device (e.g., a downstream media player/decoder) for decoding the tracks in accordance with the preselection. Depending on various implementations and/or requirements, such preselection-specific data may comprise any suitable information (e.g., in some cases, codec-specific information) and may be implemented (represented) in any suitable means (e.g., integers, arrays, strings, etc.).

In some example implementations, the processing information may comprise ordering information indicative of a track order for ordering the tracks for further downstream processing (e.g., decoding, merging, etc.). For instance, in some possible cases, the track order may be indicative of in which order the tracks are to be provided to the downstream devices (e.g., decoding devices). Similar to above, such ordering information may be implemented as being included in a (sub-)box that is associated or linked with the processing information.

In some example implementations, the processing information may comprise merging information indicative of whether one or more tracks are to be merged with one or more other tracks, for example for joint (downstream) processing. That is to say, depending on the implementation of such merging information, in some cases, some track(s) may be merged with some other track(s) for the downstream processing; whist in some other cases, some track(s) may be treated separately (e.g., being routed to individual decoding instances). Notably, in some possible cases, such merging may also be referred to as multiplexing, or any other suitable term. As will be understood and appreciated by the skilled person, the merging (multiplexing) of tracks may be achieved by using any suitable means (e.g., by appending a subsequent track to the end of a preceding track).

In some example implementations, the method may further comprise merging the one or more tracks in accordance with the merging information and the ordering information.

In some example implementations, the ordering information may comprise, for each track contributing to the preselection, a respective track order value for defining the track order of the tracks. As will be understood and appreciated by the skilled person, various suitable rules may be determined for defining the track order of the tracks by using the respective track order values. As noted above, in some possible cases, the track order may be indicative of in which order the tracks are to be provided to the downstream devices (e.g., decoding devices). In such cases, a possible example implementation (but not as a limitation of any kind) may be that a track with a smaller track order value (e.g., 1) would be provided to a decoding device earlier than another track with a larger track order value (e.g., 3). In some cases, if multiple tracks have the same value order value, then the ordering of such tracks may not be relevant or important anymore. Further, in a similar manner, the merging information may comprise a respective merge flag for each track contributing to the preselection. In particular, a first setting value (e.g., '1') of the merge flag may indicate that the respective track is to be merged (or multiplexed) with an adjoining track (e.g., a preceding or a subsequent track, depending on various implementations of such merge flag) in the track order, and a second setting value (e.g., '0') of the merge flag may correspondingly indicate that the respective track is to be processed separately (e.g., being fed/routed into a separate downstream decoding device). As such, merging the one or more tracks in accordance with the merging information and the ordering information may comprise successively (or sequentially) scanning the tracks in accordance with the track order; and merging tracks in accordance with respective merge flags. For instance, in some possible cases, if the merge flag flag [i] of a track i is set to '1', each sample of this track i may be appended to the sample(s) of the track with next lower (or higher) track order value (e.g., track i−1 or i+1); while on the other hand, if the merge flag of a track is set to '0', this track i may be provided to a separate decoder instance. As another possible example in an extreme case where all merge flags for the tracks are set to '0', applying the notion above, all the track would then be distributed to several (separate) downstream devices (e.g., sinks).

In some example implementations, the method may further comprise decoding the one or more tracks for playback of the media stream according to the media presentation indicated by the preselection.

In some example implementations, the one or more tracks may be decoded by a downstream device (e.g., a media player, a TV, a plugin, etc.).

In some example implementations, merging the one or more tracks and decoding the one or more tracks may be performed by one single device. Put differently, there may be a use case where merging and decoding work in tandem. To be more specific, an example (but not as a limitation) of such a use case may be one where a certain JavaScript API expects to only work with a single merged stream, but not with multiple streams. In such a case, one entity may generally take multiple incoming streams and merge/multiplex them as illustrated above, and subsequently send them as one merged stream over the single-stream API for decoding on the other side of the API. In some possible cases, the single-stream format may be a Common Media Application Format (CMAF) byte stream format. Of course, as will be understood and appreciated by the skilled person, in some other cases, the merging and the decoding of the tracks may be performed by different (separate) devices. As an illustrative example (but not as a limitation), a TV might be implementing the merging of the stream as illustrated above, but send the merged stream to a separate downstream device like a soundbar for subsequent decoding.

In some example implementations, the preselection may be selected (or determined) by an application (e.g., an application in control of a media player/decoder). For instance, in some possible cases, the application may be configured (e.g., based on a predefined algorithm) to (automatically) select (or determine) a preselection, e.g., corresponding to a specific setup (e.g., of the decoding or presentation environment).

In some example implementations, the media stream may comprise one or more label boxes (that may be associated or linked with respective preselections or preselection-related boxes) each comprising descriptive information for a respective media presentation to the user corresponding to a respective preselection. Accordingly, in such cases, the selection (or determination) of the preselection may be performed based on an input of the user. As an example (but not as a limitation), the label boxes may comprise descriptive information indicative selectable subtitles of various languages (e.g., English, German, Chinese, etc.) each of which may be considered as a respective preselection (presentation), such that the user (e.g., in control of an application) may select (e.g., by clicking the mouse or keyboard) a corresponding language setting as appropriate. Of course, as will be understood and appreciated by the skilled person, the selection (or determination) of the preselection may be performed in any other suitable means as well.

In some example implementations, the media stream may comprise at least one of an audio stream, or a video stream (or a combination thereof), as illustrated above. Specifically, some possible scenarios (or use cases) where the methods as proposed in the present disclosure could be applied may for example be a multi-person video conferencing (where the viewer could have the capability of selecting one or more video streams); or be a TV with picture-in-picture capability (e.g., with one picture having higher bitrate/resolution and another picture having lower bitrate/resolution).

According to a third aspect of the present disclosure, a method of processing a media stream is provided. The media stream may be an audio stream, a video stream, or a combination thereof. The method may be performed on an encoding side environment (e.g., a media encoder). In some scenarios (or use cases), such encoder may also be referred to as a (media) packager (i.e., being configured to pack/packetize the media inputs).

In particular, the method may comprise encapsulating one or more elementary streams in accordance with a predefined transport format to generate a packetized media stream, wherein the packetized media stream comprises a plurality of hierarchical boxes each being associated with a respective box type identifier. Similar to above, the predefined transport format may be the Base Media File Format (ISOBMFF) as specified by ISO/IEC 14496-12 MPEG-4 Part 12 by the ISO, or in any other suitable (transport) format. Broadly speaking, as can be understood and appreciated by the skilled person, an elementary stream may be seen as to form the compressed binary representation of the (media) data flowing from a single media encoder to a media decoder (either audio or video). When being multiplexed (or packetized) into the predefined transport format (e.g., the ISOBMFF), these elementary streams may then be called "tracks", with a "track box" describing each track's properties (or attributes) in the file header. Further, as has been described above as well, the plurality of boxes (or being referred to by using any other suitable terms) may be, depending on various implementations and/or requirements, of the same or different levels (or positions), nested (child/sub box vs. parent box), etc., as will be understood and appreciated by the skilled person.

More particularly, encapsulating the one or more elementary streams may comprise: packetizing media data of the one or more elementary streams in accordance with the transport format to generate one or more track boxes referencing (or indicating) respective tracks of the one or more elementary streams; and generating one or more preselection-related boxes of predefined type based on header information of the one or more elementary streams, wherein each of the one or more preselection-related boxes indicates a respective preselection that corresponds to a media presentation to a user.

Configured as described above, the proposed method may generally provide an efficient yet flexible manner for packetizing the media input (e.g., elementary streams) in accordance with a predefined transport format (e.g., the ISOBMFF). More particularly, by generating and including one or more preselection-related boxes (each of which being indicative of a respective preselection) alongside the packetized media stream, the proposed method may also enable to represent preselections in a unified manner being agnostic to the codecs, thereby further enabling appropriate downstream processing of the tracks contributing to the corresponding preselection (e.g., according to the methods as proposed in the preceding first and second aspects). In addition, as illustrated above, such unified representation of preselections may also enable format-agnostic implementation of preselection data handling in manifest (e.g., a MPEG Dynamic Adaptive Streaming over HTTP, DASH, format file, or an HTTP Live Stream, HLS, format file) generators, thereby avoiding the need for computational more expensive operations on binary data, and at the same time, with reduced implementation effort and increased reliability.

In some example implementations, each of the one or more preselection-related boxes may comprise metadata information indicative of characteristics of the respective preselection. More particularly, the metadata information may comprise information indicative of one or more tracks in the media stream contributing to the respective preselection. As will be understood and appreciated by the skilled person, the metadata information illustrated above may be (directly) included in or (indirectly) derivable from the media stream (or more particularly, the plurality of boxes of the (packetized) media stream) by using any suitable means, depending on various implementations. For instance, the metadata information may be comprised/included in a header (or the like) box that may be somehow associated with or linked to the preselection-related box (e.g., as a sub-box thereof).

In some example implementations, the metadata information corresponding to the respective preselection-related box may further comprise at least one of: preselection identification information indicative of a preselection identifier for identifying the respective preselection, or unique preselection-specific data (e.g., for configuring a downstream device such as a downstream media decoder) for decoding the tracks in accordance with the preselection.

In some example implementations, encapsulating the elementary media stream may further comprise generating one or more track group boxes each being associated with (a pair of) a respective track group identifier and a respective track group type that jointly identify a respective track group within the packetized media stream. In particular, tracks having the same track group identifier and the same track group type may be considered to belong to the same track group. Further, generating the one or more preselection-related boxes may comprise: assigning a first unique identifier to each preselection; and generating, for each track contributing to a respective preselection, a respective preselection-related box associated with the respective preselection, wherein the preselection-related box instantiates a track group box with a predefined track group type relating to preselection and setting the track group identifier to the first unique identifier. Such predefined track group type relating to preselection may be implemented by using any suitable means, such as a specific (predefined) string (e.g., 'preselection' or 'pres'), a specific (predefined) value (e.g., 3), or the like, as will be understood and appreciated by the skilled person. Generally speaking, in the method as proposed herein, there would generally be one such preselection-related box per preselection and per track that corresponds (contributes) to that preselection.

In some example implementations, the track group box may be generated by grouping tracks contributing to one preselection based on a respective media type of the tracks.

In some example implementations, the media type may include at least one of: audio, video, and subtitle. Of course, any other suitable media type may be used as well, as will be understood and appreciated by the skilled person.

In some example implementations, generating the one or more preselection-related boxes may further comprise: generating one or more preselection processing boxes comprising processing information indicative of how tracks contributing to a respective preselection are to be processed. The processing information may be (directly) included in or (indirectly) derivable from the media stream (or more particularly, the plurality of boxes of the (packetized) media stream) by using any suitable means, depending on various implementations. For instance, the processing information may also be comprised in a specific box (for example, of a specific (predefined) type) that may be somehow associated or linked to the preselection or the preselection-related box (e.g., as a sub-box thereof).

In some example implementations, the processing information may comprise at least one of: ordering information indicative of a track order for processing the tracks, or merging information indicative of whether one or more tracks are to be merged with another one or more tracks (e.g., for joint (downstream) processing). For instance, in some possible cases, the track order may be indicative of in which order the tracks are to be provided to the downstream devices (e.g., decoding devices). Further, depending on the implementation of the merging information, in some cases, some track(s) may be merged with some other track(s) for the downstream processing; whist in some other cases, some track(s) may be treated separately (e.g., being routed to individual decoding instances). Similar to above, the ordering information as well as the merging information may be implemented as being included in a (sub-)box (or more) that is associated or linked with the processing information.

In some example implementations, the method may further comprise: receiving at least one input media; and processing (e.g., encoding) the input media to generate the one or more elementary streams, wherein the one or more elementary streams comprise the media data of the input media and the corresponding header information. For instance, the input media may be processed (e.g., encoded) by using a suitable media encoder in order to generate the corresponding elementary streams as appropriate.

In some example implementations, the method may further comprise generating a manifest file based on the one or more preselection-related boxes. Generally speaking, the manifest file may typically comprise various information, e.g., information about the media stream (such as media type, codec attribute, media-specific properties, etc.). Aside from such information (i.e., relating to the media stream per se), the proposed method may further include information associated with preselections. The preselection-related information may comprise but is not limited to, metadata information, processing information, or the like. Compared with conventional techniques, the proposed method for the generation of the manifest files may generally offer a format-agnostic implementation for the preselection related data handling, thereby avoiding computational more expensive operations (e.g., those have to be performed on binary data in conventional techniques), reducing implementation and/or testing effort, and increasing reliability.

In some example implementations, the manifest file may be a MPEG Dynamic Adaptive Streaming over HTTP (DASH) format file, an HTTP Live Stream (HLS) format file, or any other suitable manifest format file, as will be understood and appreciated by the skilled person.

According to a fourth aspect of the present disclosure, a method of processing a media stream is provided. The media stream may be an audio stream, a video stream, or a combination thereof. The method may be performed by a manifest generator, for example.

In particular, the method may comprise receiving the media stream packetized in accordance with a predefined transport format. In particular, the packetized media stream may comprise a plurality of hierarchical boxes each being associated with a respective box type identifier, wherein the plurality of boxes may comprise one or more track boxes referencing (e.g., indicating) respective tracks indicative of media components of the media stream and one or more preselection-related boxes of a predefined type, and wherein each preselection-related box indicates a respective preselection that corresponds to a media presentation to a user.

Further, the method may also comprise generating a manifest file based on the one or more preselection-related boxes.

Configured as described above, the proposed method may generally provide an efficient yet flexible manner for generating a manifest file by taking the preselection related information (e.g., descriptive information and/or processing related information) also into account. More particularly, aside from information relating to the media stream(s), the proposed method may further include information associated with preselections. The preselection-related information may comprise but is not limited to, metadata information, processing information, or the like. Compared with conventional (manifest generation) techniques, the proposed method for the generation of the manifest file may generally offer a format-agnostic implementation for the preselection related data handling, thereby avoiding computational more expensive operations (e.g., those have to be performed on binary data in conventional techniques), reducing implementation and/or testing effort, and increasing reliability.

In some example implementations, the manifest file may be a MPEG Dynamic Adaptive Streaming over HTTP (DASH) format file, an HTTP Live Stream (HLS) format file, or any other suitable manifest format file, as will be understood and appreciated by the skilled person.

In some example implementations, the media presentation to the user may be characterized by a respective configuration relating to language, kind, and/or one or more media specific attributes of the media stream. Of course, any other suitable configuration may be used as well, depending on various implementations.

In some example implementations, the predefined transport format may be an ISO Base Media File Format (ISOBMFF), or any other suitable transport format.

According to a fifth aspect of the present invention, a media stream processing apparatus including a processor and a memory coupled to the processor is provided. The processor may be adapted to cause the media stream processing apparatus to carry out all steps according to any of the example methods described in the forgoing aspects.

According to a sixth aspect of the present invention, a computer program is provided. The computer program may include instructions that, when executed by a processor, cause the processor to carry out all steps of the methods described throughout the present disclosure.

According to a seventh aspect of the present invention, a computer-readable storage medium is provided. The computer-readable storage medium may store the aforementioned computer program.

It will be appreciated that apparatus features and method steps may be interchanged in many ways. In particular, the details of the disclosed method(s) can be realized by the corresponding apparatus (or system), and vice versa, as the skilled person will appreciate. Moreover, any of the above statements made with respect to the method(s) are understood to likewise apply to the corresponding apparatus (or system), and vice versa.

BRIEF DESCRIPTION OF DRAWINGS

Example embodiments of the present disclosure are explained below with reference to the accompanying drawings, wherein like reference numbers indicate like or similar elements, and wherein.

DETAILED DESCRIPTION

Figure 1A:
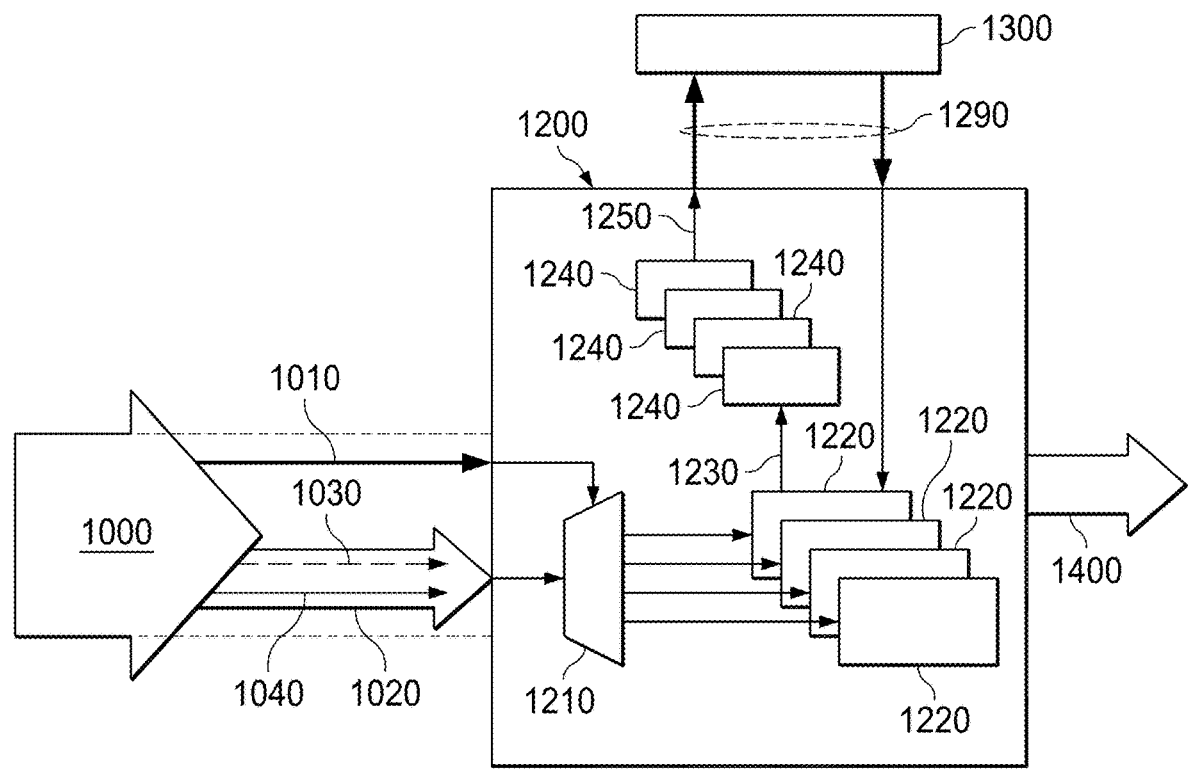
FIG. 1A is a schematic illustration showing an exemplary implementation of a media play application programming interface (API)

As indicated above, identical or like reference numbers in the present disclosure may, unless indicated otherwise, indicate identical or like elements, such that repeated description thereof may be omitted for reasons of conciseness.

Particularly, the Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Furthermore, in the figures, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the present invention. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

As indicated above, in a broad sense, this document generally seeks to propose techniques to enable the concept of Preselections within the context of ISOBMFF files, thereby being able to complete the availability in MPEG-DASH and various other media compression formats.

Thus, example embodiments described herein may relate to methods, apparatuses, and processes which are directed to various use cases of "Preselections".

Before going into details for describing the example embodiments, it may still be worthwhile to describe some of the possible terminologies that may be used throughout the present disclosure, for ease of understanding, even though some of which may have already been (briefly) discussed above.

Particularly, for the purposes of this document, with regard to "Preselections" such term shall generally mean a set of one or multiple media (content) components simultaneous decoding/presentation as described in for example MPEG-DASH (ISO/IEC 23009-1). As will be understood and appreciated by the skilled person, in some other possible technical contexts, the "Preselections" may also be known (or referred to) by using other suitable (comparable) terms, such as (but not limited to) "Presentations" as described in for example ETSI TS 103190-2, or "Presets" as described in for example ISO/IEC 23008-3, etc.

With regard to "AdaptationSet" such term shall generally be defined as described comparably in MPEG-DASH (ISO/IEC 23009-1), and, similar as above, may also be known (referred to) as other terms, such as a "SwitchingSet" as defined in Common Media Application Format (CMAF).

With regard to "Representation", such term shall generally be defined as described in MPEG-DASH (ISO/IEC 23009-1), and may also be known as "AudioTrack" (e.g., as defined by W3C API) or "Tracklist" or "Track" (e.g., as defined by ISOBMFF).

With regard to "media content component" such phrase/term shall generally mean a single continuous component of the media content with an assigned media content component type, for example as described in MPEG-DASH (ISO/IEC 23009-1).

With regard to "media content component type" such phrase/term shall generally mean a single type of media content, for example as described in MPEG-DASH (ISO/IEC 23009-1). As will be understood and appreciated by the skilled person, examples of the media content component type may include, but is not limited to, audio, video, text, or any other suitable type.

With regard to "box" such term shall generally mean an object-oriented building block defined by a unique type identifier and length for example as described in ISO 14496-12. Similar as above, it may be noted that the term "box" can alternatively be called an "atom" in some specifications (including the first definition of MP4), or any other suitable similar terms.

With regard to "container box" such phrase/term shall generally mean a box whose sole purpose is to contain and group a set of related (sub-)boxes for example as described in ISO 14496-12. It is nevertheless to be noted that container boxes are normally not derived from "fullbox".

Finally, with regard to "ISO Base Media File" such phrase/term shall generally mean a file conforming to the file format (i.e., ISOBMFF) as specified in ISO 14496-12.

Therefore, unless explicitly indicated otherwise, the above-illustrated terms and/or phrases may be used interchangeably, as will be understood and appreciated by the skilled person.

It may also be worthwhile to first describe some possible use cases (scenarios) relating to preselections, particularly from an abstract and broad overall perspective, before going into the technical details of the respective exemplary embodiments.

Referring to the drawings, FIG. 1A is a schematic illustration showing an exemplary implementation of a media play application programming interface (API). Put differently, FIG. 1A may be seen as an example use case of presentation (preselection) selection in the media player. More particularly, the example of FIG. 1A is generally considered as one possible implementation for supporting preselection, by using conventional techniques.

In a broad sense, although some media content may be delivered using means like MPEG DASH which generally utilizes manifest files, some player frameworks may just consume contents in an ISOBMFF format. In consequence, media players based on such an architecture would be required to enable presentation selection based on metadata information that is contained in ISOBMFF only and, as a result, cannot rely on signaling from the manifest file(s) anymore.

As shown in FIG. 1A, a media player 1200 receives an input media (or file) 1000 for generating corresponding media output/presentation 1400. The input media 1000 may be an (packetized) container format file or stream (e.g., a ISOBMFF file or stream). The media player 1200 is controlled by a suitable application 1300. Traditional controls of such application 1300 and correspondingly also the media player 1200 may include, but is not limited to, "play", "pause", "stop", "forward", "rewind", etc. However, with the Next-Generation Audio (or similar video technologies), the media player 1200 may be required to present a list of available experiences (or presentations) to the application 1300 and, in return, take the desired selection from it. This may generally be implemented in an API 1290 between the media player 1200 and the application 1300.

Generally speaking, the incoming ISOBMFF 1000 provides (includes) metadata in a container-format specific representation 1010 (e.g., being implemented as one or more boxes, or in any other suitable forms) as well as the media elementary stream(s) 1020. Particularly, such container-format metadata 1010 may be arranged as Byte-data, which may generally be codec-specific. Further, the elementary stream 1020 itself may comprise header information data (or, in some cases, may also be referred to as some sort of metadata) 1030 (which is typically in the form of binary data) as well as the coded (or compressed) media data 1040 (which is, similar to the binary metadata 1030, typically in the form of binary data). As can be understood and appreciated by the skilled person, broadly speaking, the elementary stream data 1040 may typically be represented in binary information (bit data) while the container data 1010 may typically utilize Byte data.

Moreover, as shown in FIG. 1A, the media player 1200 itself may comprise multiple decoder implementations (or instances) 1220 for a multitude of different media formats (or in other words, being format or codec specific), requiring the media player 1200 to correspondingly also provide a suitable selecting element/component (or simply referred to as a selector) 1210 to unpack the elementary stream from the container format data and to decide which media decoder

1220 to use. This decision is generally based on container format metadata 1010 as mentioned above.

As further shown in FIG. 1A, the preselection-enabled decoders 1220 provide (e.g., generate) preselection-related data 1230. Such codec-specific data 1230 must be converted into a codec-agnostic generalized format 1250 by corresponding format converters 1240, in order to be consumed by the application 1300 via the respective API 1290 (which is typically codec-agnostic).

In general, the operations related to unpacking the elementary stream, converting codec/format-specific data into a codec-agnostic generalized format may introduce (undesirable) extra work (e.g., for implementation, for testing, etc.) of the overall procedure, and thus may be considered inefficient to some extent.

Figure 1B:
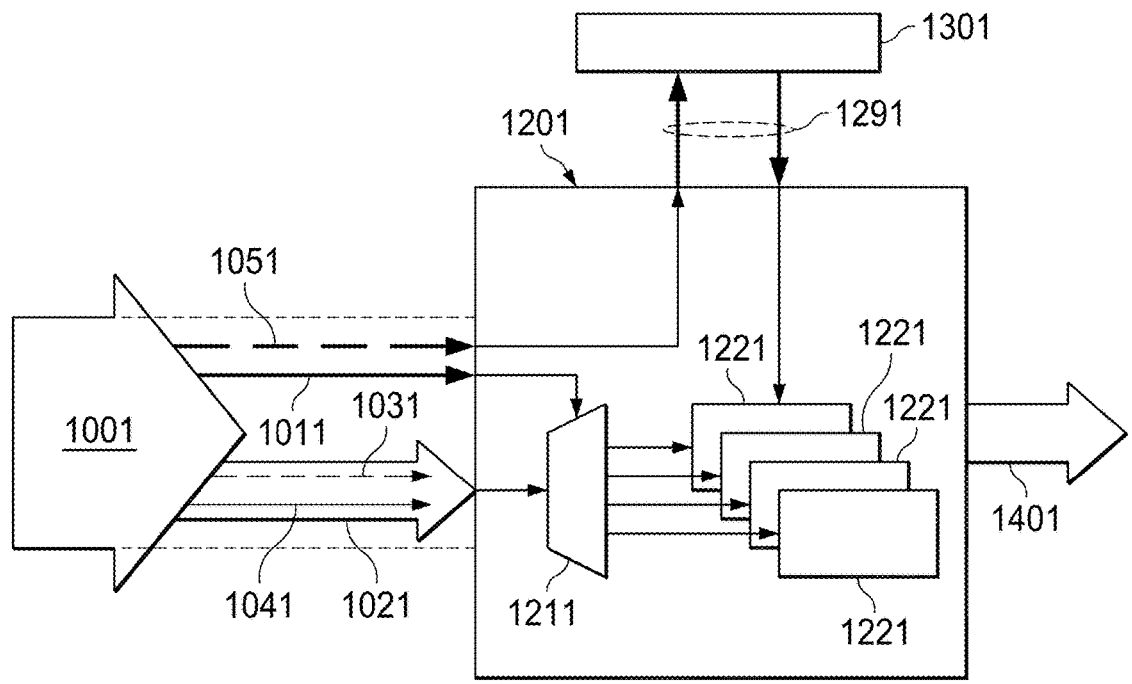
FIG. 1B is a schematic illustration showing an exemplary implementation of a media play API according to embodiments of the present disclosure.

In order to address some or all of the issues as discussed with respect to FIG. 1A, FIG. 1B schematically illustrates an exemplary implementation of a media play API according to embodiments of the present disclosure. Notably, as indicated earlier, identical or like reference numbers in FIG. 1B may, unless indicated otherwise, indicate identical or like elements in FIG. 1A, such that repeated description thereof may be omitted for reasons of conciseness.

Particularly, in comparison to FIG. 1A, the media player 1201 as shown in FIG. 1B is no longer required to read the respective API of each decoder 1221, reformatting its output and providing the data format-independently.

Instead, with the new data structure 1051 (typically in Byte format) relating to preselection (as will be discussed in more details below) inside the incoming ISOBMFF file or stream 1001, the media player 1201 can just present this data 1051 to the application 1301 at its respective API 1291. The main reason is that such preselection-related data 1051 is codec-agnostic.

Configured as proposed, this approach generally eliminates the need to implement multiple format-dependent metadata format converters (e.g., the format converters 1240 as shown in FIG. 1A). Furthermore, the proposed approach also implicitly defines a unified data structure that may be used to present the preselection-related metadata (e.g., the new data structure 1051) at the media player API 1291. Put differently, with the new proposed data structures, media players may now be enabled to expose the contained information via appropriate APIs to request the application to select the desired presentation (preselection). More specifically, this approach works codec-agnostic and provides a light-weighted approach since it avoids the need to parse into the coded media essence.

Summarizing, as will also be understood and apprenticed by the skilled person, the above-proposed approach for the use case of the media player API generally offers at least the following benefits, namely:
- unified representation for Preselections in top-level in transport data format such as ISOBMFF;
- unified data structure for media player API;
- no format-specific implementation in media players required; and
- less effort for implementers, less testing effort, increased reliability, and fast uptake by industry.

Figure 2:
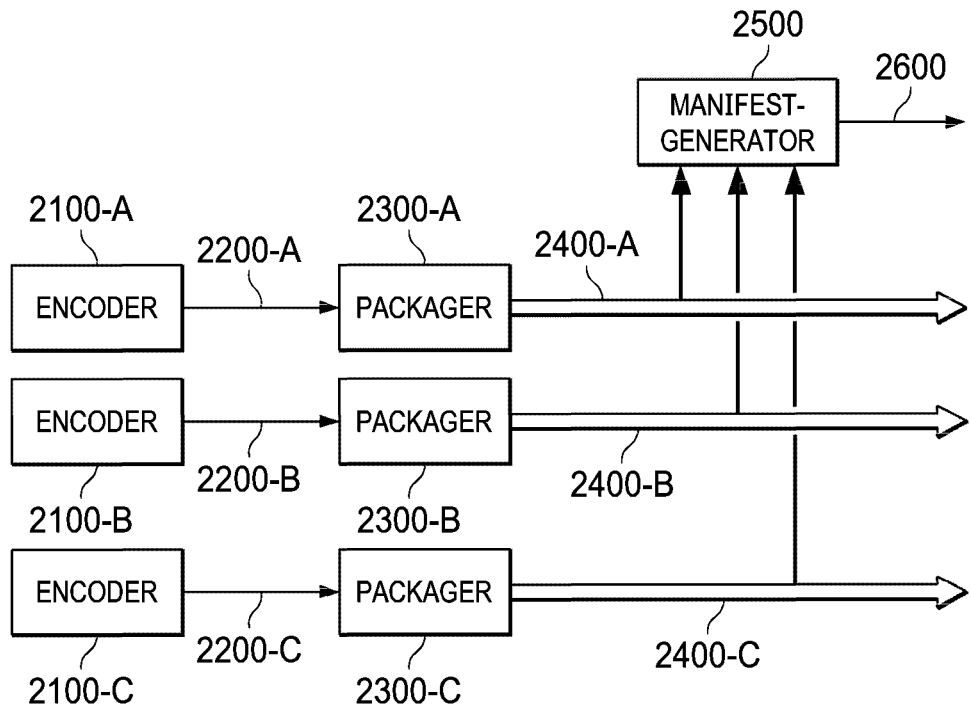
FIG. 2 is a schematic illustration showing an exemplary implementation of a system of processing media streams according to embodiments of the present disclosure.

FIG. 2 is a schematic illustration showing an exemplary implementation of a system of processing media streams according to embodiments of the present invention. In particular, FIG. 2 may be seen to schematically show a possible overall workflow for such a media processing system.

Particularly, as shown in FIG. 2, like the media player use case as described with respect to FIGS. 1A and 1B, (auto-mated) manifest generators 2500 may need access to experiences (presentations) contained in the incoming media data as well. As, in general, a multitude of used codecs may have to be handled in such a processing system, these devices 2500 would be preferably operated on codec-agnostic metadata. Moreover, since data side-paths are also undesirable for robust operation in general, any metadata structure to be used may need to be comprehensive and provide all the details that should show up in the manifests (or manifest files).

In the example system workflow as shown in FIG. 2, media (e.g., audio and/or video) encoders 2100-A, 2100-B and 2100-C generally generate coded media streams 2200-A, 2200-B and 2200-C in different formats (e.g., MP3, MP4, AC-4, etc.). These elementary streams 2200-A-C are then fed to packagers 2300-A, 2300-B and 2300-C for encapsulation into a unified transport format such as the ISOBMFF.

Each of these ISOBMFF files or streams 2400-A, 2400-B and 2400-C may then be distributed to respective media players (not shown), but may also be to a manifest generator 2500 for generating a corresponding manifest file 2600 as output. Such a file (e.g., a MPEG DASH format file or an HLS format file) may often be represented in a machine and/or human readable format such as XML (extensible Markup Language).

Figure 3A:
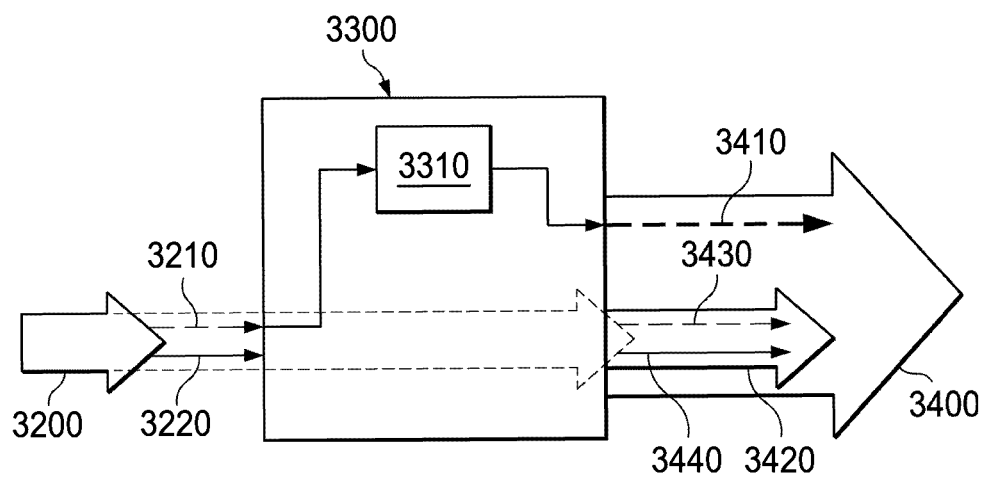
FIG. 3A is a schematic illustration showing an example implementation of a packager.

Now, with reference to FIG. 3A, an example diagram illustrating a possible implementation of a packager (e.g., the packager 2300-A-C) is provided.

In particular, as shown with respect to FIG. 3A, an incoming media elementary stream 3200 (e.g., the elementary streams 2400-A-C as exemplified in FIG. 2) consisting of (binary) media header information or metadata 3210 and (binary) coded/compressed (raw) media information/data 3220 is subsequently being packaged into a container format output file or stream (e.g., ISOBMFF) 3400.

More particularly, in this process, the packager 3300 generally passes the incoming stream data 3200 in an unaltered manner into a corresponding output representation 3420. A suitable internal apparatus (or component) 3310 of the packager 3300 may read the binary header information/metadata 3210 in order to generate corresponding descriptive metadata information but in Byte format 3410 for the media output 3400. Such apparatus (or component) 3310 of the packager 3300 may for example be a decoder specific information (DSI) generator, or any other suitable component. This data 3410 may later be used by respective media players (e.g., the media player 1200 as shown in FIG. 1A) to select an appropriate decoder (e.g., the decoder 1220 as shown in FIG. 1A). In the exemplary use case of ISOBMFF, this descriptive Byte data 3410 may include, among others, decoder specific information (DST for short), but also certain generic annotations on elementary streams. As illustrated earlier, the elementary streams may be referred to as tracks when encapsulated in certain file formats such as ISOBMFF.

Figure 3B:
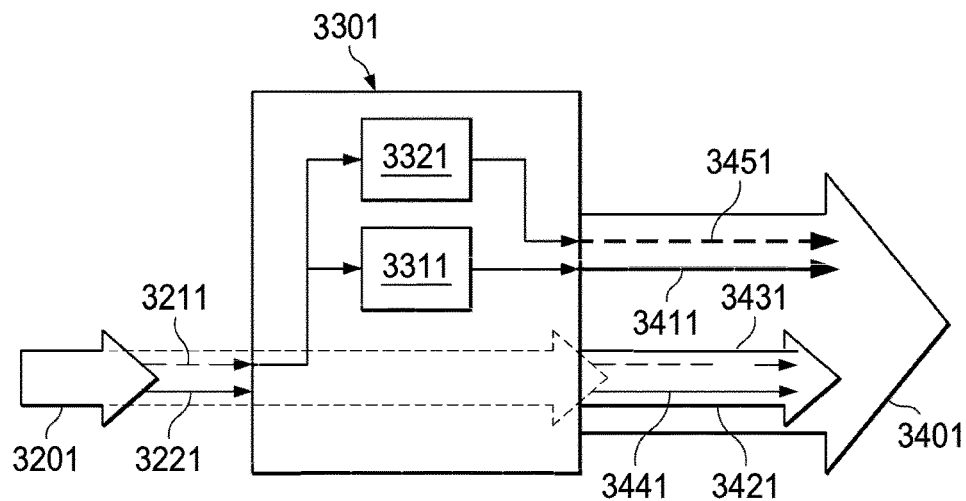
FIG. 3B is a schematic illustration showing an example implementation of a packager according to embodiments of the present disclosure.

In comparison to the implementation of FIG. 3A, FIG. 3B schematically illustrate a possible example implementation of a packager according to embodiments of the present invention. Similar as above, identical or like reference numbers in FIG. 3B may, unless indicated otherwise, indicate identical or like elements in FIG. 3A, such that repeated description thereof may be omitted for reasons of conciseness.

More particularly, as shown with respect to FIG. 3B, the packager 3301 may now comprise a further (internal) apparatus/component 3321 (which may, in some possible cases, be referred to as a preselection data generator) that is also provided with the binary header information 3211 of the incoming media stream 3201. In some possible cases, the functionality of this apparatus 3321 may be also implemented as additional functionality as part of the existing (internal) apparatus 3311. However, as clearly shown in FIG. 3B, in such cases, an additional Byte-format specified data structure 3451 is generated and embedded into the output stream 3400. Notably, as illustrated above, this data structure 3451 generally carries the (codec-agnostic) preselection related information (e.g., descriptive information and/or processing related information) and a media format independent representation.

Figure 4A:
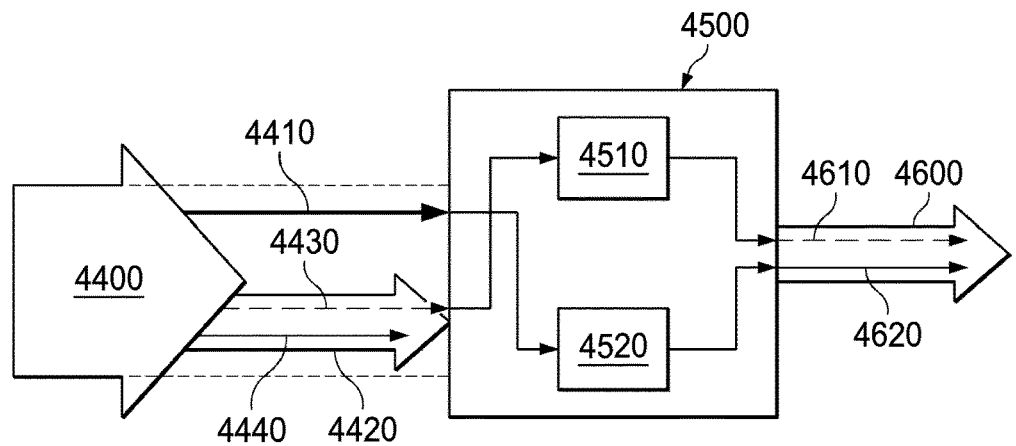
FIG. 4A is a schematic illustration showing an example implementation of a manifest generator.

FIG. 4A is a schematic illustration of an example implementation of a manifest generator.

In particular, as shown with respect to FIG. 4A, the manifest generator 4500 generally reads an input file or stream 4400 (e.g., an ISOBMFF file) to generate the required information for a corresponding manifest file 4600. Such required data may include the information about the media stream 4620 such as an appropriate media type (sometimes also referred to as the MIME type), codec attributes, as well as media specific properties. All of the information may be generated based on data available from the container-level metadata structure 4410, independently for each media file or stream.

Aside from the information associated with these individual media files or streams, preselection related information 4610 may also need to be generated. In convention techniques, the required information may typically need to be provided though for example some sort of out-of-band side data paths (now shown in FIG. 4A), or from parsing the binary header data of the encapsulated elementary stream.

Particularly in the latter case, a corresponding apparatus/component 4510 (which may, in some possible cases, be referred to as a preselection data generator or using any other suitable term) would therefore be not only codec-format dependent but also require computational expensive binary data parsing and, depending on the used media format, additional format-dependent knowledge on how to generate corresponding preselections from available content component metadata. In certain cases, this step would additionally require reading the payload of multiple media files or streams jointly, making this process difficult and error-prone. In some possible case, the manifest generator 4500 may also comprise another (internal) apparatus/component 4520, which may be responsible for performing operations like media-specific signaling (e.g., "AdaptationSet"), as will be understood and appreciated by the skilled person.

Figure 4B:
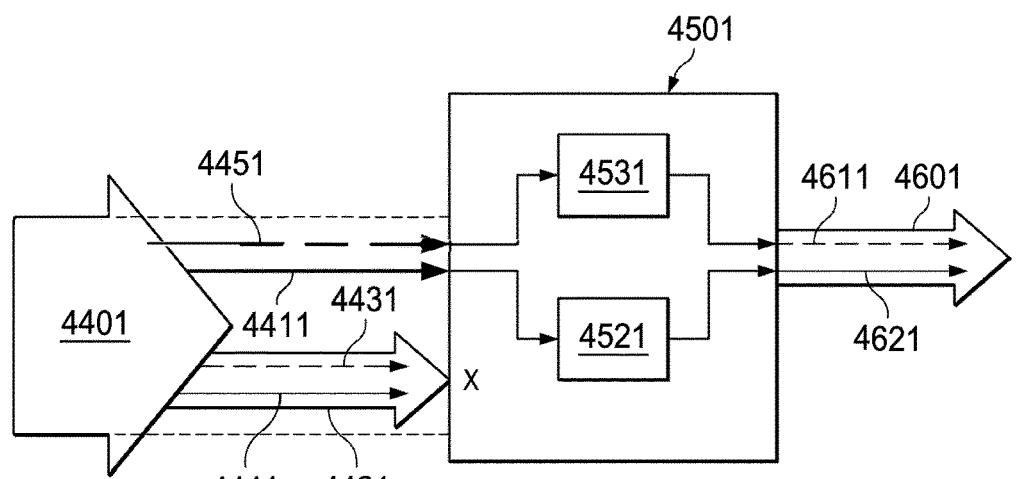
FIG. 4B is a schematic illustration showing an example implementation of a manifest generator according to embodiments of the present disclosure.

In order to address some or all of the issues as discussed with respect to FIG. 4A, FIG. 4B schematically illustrates an exemplary implementation of a manifest generator according to embodiments of the present disclosure. Notably, as indicated earlier, identical or like reference numbers in FIG. 4B may, unless indicated otherwise, indicate identical or like elements in FIG. 4A, such that repeated description thereof may be omitted for reasons of conciseness.

Particularly, as shown with respect to FIG. 4B, utilizing the preselection-related data structure 4451 as proposed, not only the need for a codec-specific binary parser can be avoided, but also the manifest generator 4501 can rely on the pre-generated information from the proposed data structure 4451 of the incoming stream 4401. As can be understood and appreciated by the skilled person, this data structure 4451 is already aligned with desired output data 4611. Consequently, the manifest generator 4501 as proposed herein would generally require only a preselection data converter 4531 responsive for translating the Byte information into the representation of the Manifest file, e.g., XML, as opposed to the preselection data generator 4510 as shown in FIG. 4A (which is codec-specific).

Summarizing, as will also be understood and apprenticed by the skilled person, the above-proposed approach for the use case of the manifest generator generally offers at least the following benefits, namely:

format agnostic implementation of preselection data handling in manifest generators;

implementation in Byte format only avoid the need for computational more expensive operations on binary data;

low overhead to implement preselection metadata in packager due to high overlap with existing functionality;

equal manifest generator operation for all media formats; and less effort for implementers, less testing effort, increased reliability, and fast uptake by industry.

As illustrated above and elsewhere in this disclosure, the techniques as proposed in the present disclosure may be applied to the processing of audio streams as well as video streams (or a combination thereof). Specifically, when video processing is concerned, it may be worthwhile to discuss some of the potential use cases in more detail, for further understanding the present invention.

One possible use case may include framerate/resolution scalable video processing. To be more specific, some possible MPEG codecs (e.g., in the context of Versatile Video Coding (VCC) as defined in ISO/IEC 23090-3 ("MPEG-I, Part 3"), also known as ITU-T H.266, or the like) may provide for the option of creating a plurality of display frame rates from the same stream. For instance, one stream could be decoded into 50 Hz or, at the cost of higher complexity, also be decoded into 100 Hz. As can be understood and appreciated by the skilled person, the possibility of decoding one stream into either frame rate could be covered with the concept of preselections as proposed in the present disclosure. In a related use case, one stream would carry just the bits for the 50 Hz preselection, and a second stream would provide the additional bits for the 100 Hz preselection-such that to decode into 100 Hz, two streams would be referenced by the 100 Hz preselection. Similarly, instead of scaling the frame rate, the resolution of the image might be scaled, so the above illustration also applies to multi-resolution streams.

Another conceivable example use case may relate to joint SDR/HDR streams. This particular use case may relate to the concept of high dynamic range (HDR) which provides higher contrast and sometimes also wider color gamut (WCG) compared to legacy video in standard dynamic range (SDR). Systems such as those who provide backward compatible enhancement layers may be used to create streams that can be decoded either for SDR displays, or for HDR capable displays. The possibility to derive different experiences from either the same or a plurality of streams can be signaled with preselections relating to the different experiences.

Yet another video-related use case may relate to the technique of picture-in-picture (pip for short). Specifically, in this use case, part of the video composition may be replaced by different content (e.g., by using the concept of "subpictures" in VCC, or any other suitable means). An example would be a news program where part of the display is replaced with a video capture of the sign-language interpreter interpreting the content for a hearing impaired audience. This is another example where the final experience is composed of different parts, where the parts are (collectively) selected by a preselection.

Having discussed the possible use cases above, reference is now made to FIGS. 5 to 8, wherein flowcharts illustrating examples of a method of processing a media stream according to embodiments of the present invention are schematically illustrated.

Figure 5:
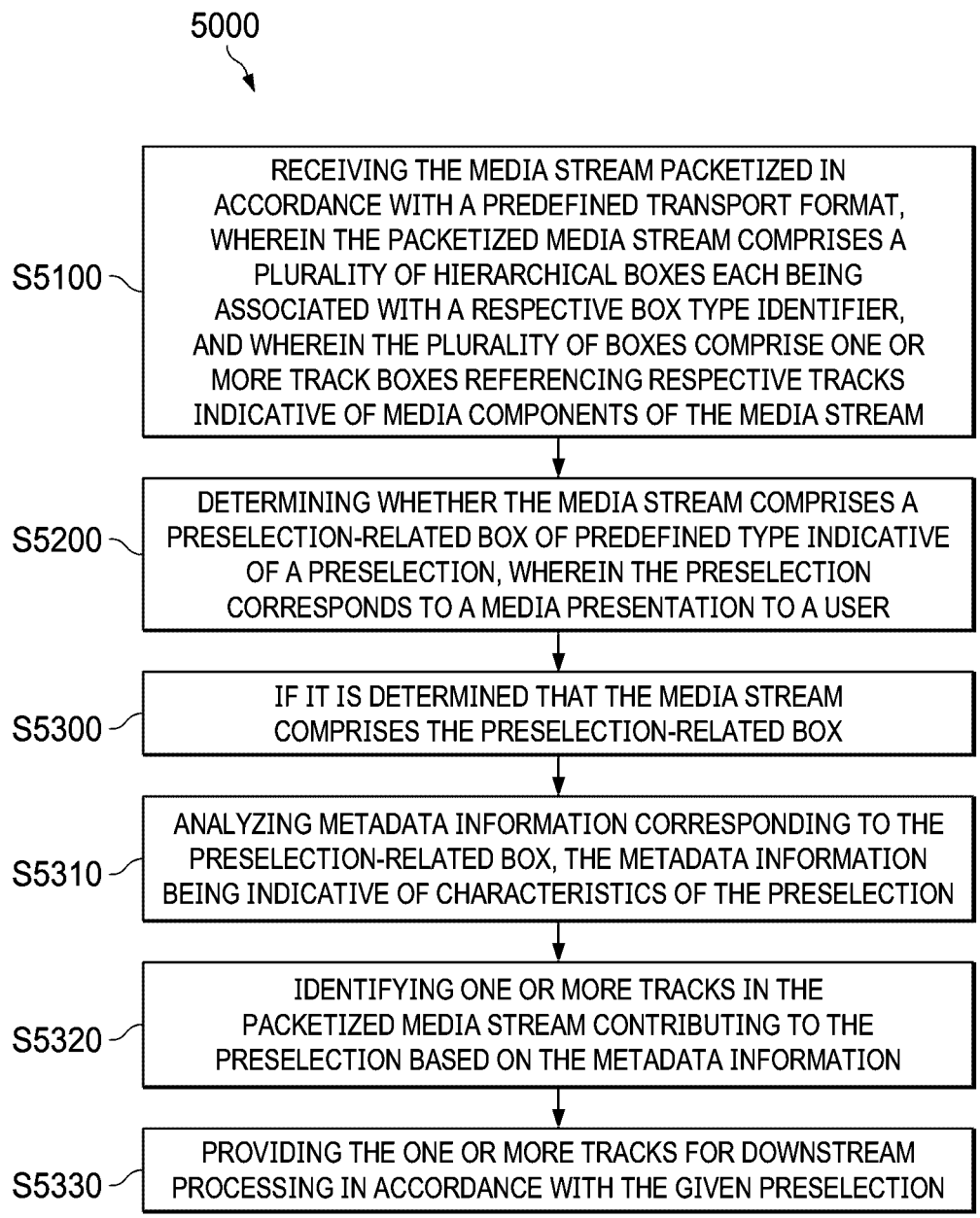
FIG. 5 is a schematic flowchart illustrating an example of a method of processing a media stream according to embodiments of the present disclosure.
Figure 6:
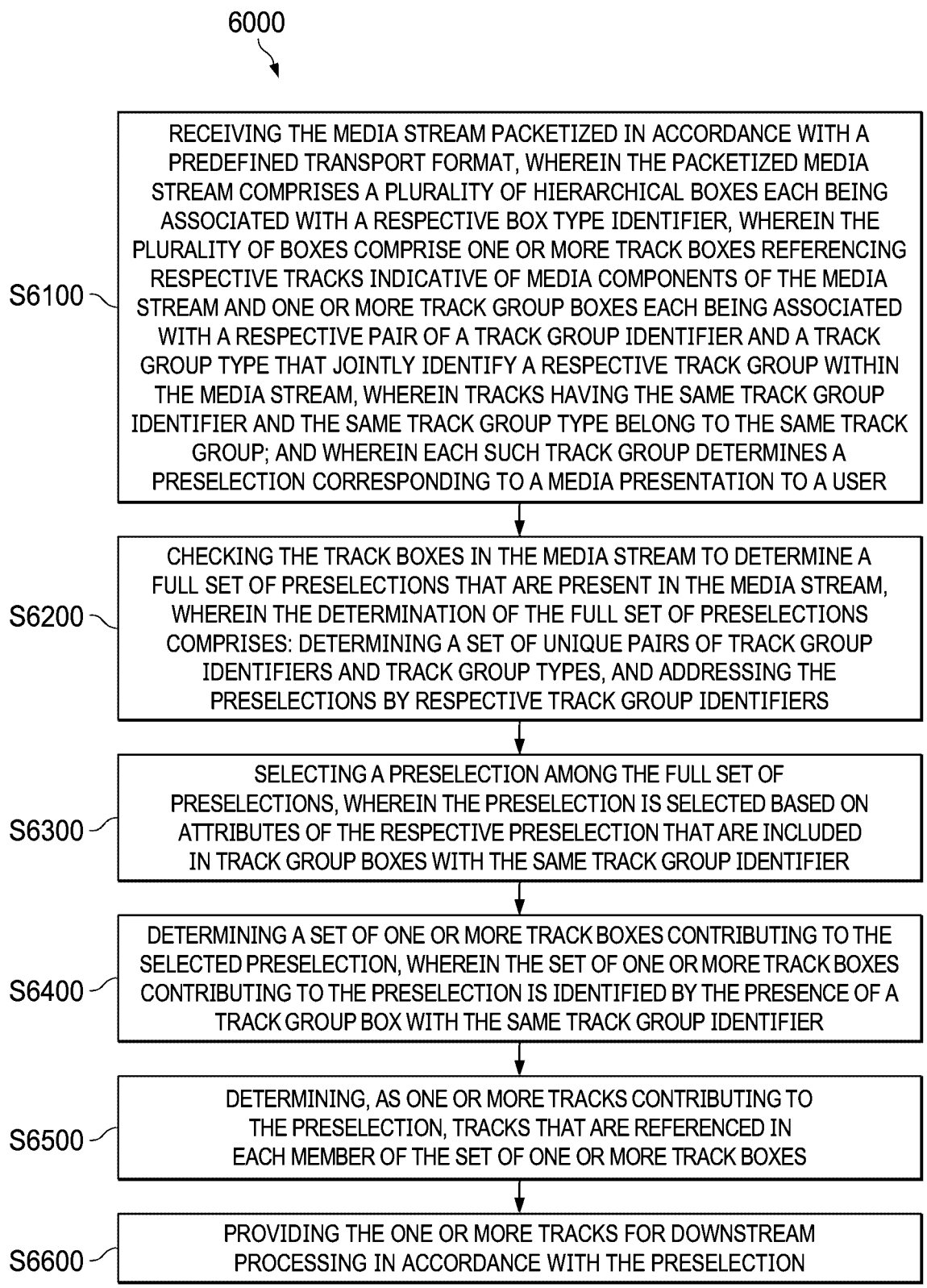
FIG. 6 is a schematic flowchart illustrating another example of a method of processing a media stream according to embodiments of the present disclosure.

Particular, from a broad perspective, the method stream processing methods of FIGS. 5 and 6 may be seen as two possible solutions for handling (signaling) information related to preselections in a transport format file (e.g., the ISOBMFF) that may be implemented together or alternatively, depending on various implementations and/or circumstances. On the other hand, the method stream processing methods of FIGS. 7 and 8 may be seen as to correspond to the possible use cases of the packager and the manifest generator as described above with reference to FIGS. 3B and 4B, respectively.

More particularly, the method 5000 as shown in FIG. 5 may start at step S5100 by receiving a media stream packetized in accordance with a predefined transport format. As illustrated earlier, the media stream may be an audio stream, a video stream, or a combination thereof, such as the media stream 3401 as prepared by the packager 3301 as described with reference to FIG. 3B. The method 5000 may be performed on a user side, or in other words, in a user (decoding) side environment, which may include, but is not limited to, a TV, a soundbar, a web browser, a media play, a plugin, etc., depending on various implementations. The predefined transport format may be the Base Media File Format (ISOBMFF) as specified by ISO/IEC 14496-12 MPEG-4 Part 12 by the ISO, or in any other suitable (transport) format. Specifically, the packetized media stream may comprise a plurality of hierarchical boxes each being associated with a respective box type identifier. As noted above, the term "box" as used throughout the disclosure shall not be understood to be limited to such specific term only. Rather, the term "box" shall be generally understood as any suitable data structure that may serve as a placeholder for the media data in the packetize media stream, and thus, may be referred to by using other suitable terms. Further, the plurality of boxes may be, depending on various implementations and/or requirements, of the same or different levels (or positions), nested (child/sub box vs. parent box), etc., as will be understood and appreciated by the skilled person. The plurality of boxes may comprise, among other possibilities, one or more track boxes referencing (or in other words, indicating) respective tracks indicative of media (content) components of the media stream. Broadly speaking, the media (content) component may generally refer to a single/individual continuous component of the media content (and, may typically be also associated with a corresponding (assigned) media content component type, such as audio, video, text, etc.). An example for understanding the concept of the "media (content) component" may be found as defined/described for example in MPEG-DASH (ISO/IEC 23009-1).

Subsequently, in step S5200 the method 5000 may comprise determining whether the media stream comprises a preselection-related box of a predefined type indicative of a preselection, wherein the preselection may correspond to a media presentation to a user. As noted above, the term/phrase "preselection" is generally used to refer to a set of media content components (of the media stream) that are intended to be consumed jointly (e.g., by a user-side device), and more particularly, that generally represent one version of the media presentation that may be selected by the end-user for simultaneous decoding/presentation. Of course, as will be understood and appreciated by the skilled person, in some other possible technical contexts, the term "preselection" may also be known (or referred to) by using other suitable (comparable) terms, such as (but not limited to) "presentations" as described in for example ETSI TS 103190-2, or "presets" as described in for example ISO/IEC 23008-3, etc. Accordingly, the preselection-related box may be a specific box among the plurality of boxes in the media stream that is of a specific predefined (or predetermined) type. Such specific type indicative of the preselection may be predefined (or predetermined) in advance by using any suitable means as will be understood and appreciated by the skilled person.

If it is determined in step S5300 that the media stream comprises the preselection-related box, the method 5000 may yet further comprise, at step S5310, analyzing metadata information corresponding to the preselection-related box, the metadata information being indicative of characteristics of the preselection; at step S5320, identifying one or more tracks in the packetized media stream contributing to the preselection based on the metadata information; and finally at step S5330, providing the one or more tracks for downstream processing in accordance with the given preselection. As will be understood and appreciated by the skilled person, the metadata information illustrated above may be (directly) included in or (indirectly) derivable from the media stream (or more particularly, the plurality of boxes of the (packetized) media stream) by using any suitable means, depending on various implementations. For instance, the metadata information may be comprised in a header box that may be somehow associated or linked to the preselection-related box (e.g., as a sub-box thereof). As noted above, the preselection generally refers to a set of media content components that are intended to be consumed jointly, for example by one or more suitable downstream devices (e.g., a media decoder, a media player, etc.). The downstream device may also be referred to simply as a "sink" in some possible cases. In consequence, depending on various implementations and/or requirements, the downstream processing may comprise, but is not limited to, multiplexing (or re-multiplexing), ordering, merging, decoding, or rendering those contributing tracks, as described above.

Configured as above, the proposed method 5000 may generally provide an efficient yet flexible manner for determining/identifying and subsequently signaling tracks within a media stream that are configured to contribute to a specific preselection, thereby enabling further downstream processing of such contributing tracks (e.g., by one or more downstream devices). As such, broadly speaking, the proposed method may be seen to offer the possibility and capability of signaling information indicative of preselections (and possibly the processing thereof) in a transport layer file (e.g., the ISOBMFF), in a unified manner, which may be considered beneficial in various use cases or scenarios, such as those as described in detail above with references to FIGS. 1A, 2, 3B and 4B.

Notably, as can be understood and appreciated by the skilled person, the International Organization for Standardization (ISO) along with the International Electronical Commission (IEC), have jointly published a functional document for implementation of certain technology titled: ISO/IEC 14496-12, Information technology—Coding of audiovisual objects—Part 12: ISO base media file format (the latest version published in 2020 and available at https://www.iso.org/standard/74428.html). Originally drafted by the Motion Picture Experts Group (MPEG), this document specifies the ISO base media file format (or ISOBMFF for short), which is a general format forming the basis for other more specific file formats.

As has been illustrated above already, media information within the ISOBMFF is typically structured in a hierarchical, object-oriented way by utilizing building blocks called "Boxes". These data structures are defined by a unique type identifier and length and can be nested or concatenated forming the overall file structure.

Individual media data within the file format such as one single video or audio component may be called a "Track", represented as an elementary stream generated in advance by a media encoder.

This file format contains the timing, structure, and media information for timed sequences of media data, such as audio-visual presentations. The ISO/IEC 14496-12 already contains several means to describe properties of media components. Such descriptive elements or dedicated Boxes are assigned to individual tracks and sub-tracks within the Movie Header ('moov') Box. Such available Boxes include the "extended language tag" ('elng') Box or the Kind ('kind') Box.

For the purpose of signaling properties of combinations of tracks or sub-tracks, as illustrated above in detail with reference to FIG. 5, the present disclosure generally proposes to, as some possible implementations, provide new data structures to be used in parallel to the definition of tracks for example within the movie header (or any other suitable boxes). It is nevertheless to be noted that, while linking each of these so-called preselections to their constituting (contributing) media tracks is part of the present proposal, the existing means for signaling their respective properties should be reused as far as possible.

For instance, in some possible implementations, two new boxes may be introduced, wherein one container box may be considered as forming the counterpart to the DASH preselection element and taking all descriptive and structural metadata as child boxes; and another box may be a (mandatory) header box taking the structural metadata to create preselection. Certainly, as has been illustrated above in detail, any further suitable boxes (e.g., processing related boxes) may be included as well, if needs be. In such cases, linking a preselection to tracks may for example be accomplished by utilizing the unique track identifier (ID) assignments in the track header of each track. Since preselection generally needs to be referenced by external applications, a unique identifier shall be assigned accordingly. In particular, the preselection identifier shall be unique in the scope of the whole bundle, i.e. across all ISOBMFF files available for this media presentation. Moreover, since the encoded media format may utilize different assignments, further element(s) may need to be defined and/or set accordingly (e.g., using a corresponding tag to map a respective identifier as used in the media format, or the like).

In view thereof, with the aim of implementing the proposed method as described above with regard to FIG. 5, particularly for supporting preselection within the context of ISOBMFF, in some possible implementations, it may be generally proposed to amend (create, or replace) ISO 14496-12, section 8 with the following text:

3.1 Terms and Definitions 3.1.x Preselection
A set of one or multiple media components representing one version of the media presentation that may be selected by a user for simultaneous decoding/presentation.

3.1.y Bundle
A set of multiple tracks not necessarily contain in one single ISOBMFF file providing the overall available experience of the media presentation.

8.18 Preselection Structure
8.18.1 Introduction
8.18.2 Backward Compatibility
8.18.3 Preselection Box
Definition
  Box Type: 'pres'
  Container: Movie Box ('moov'), Movie Fragment Box ('moof')
  Mandatory: No
  Quantity: Zero or more This is a container box for a single preselection. A preselection provides the description and technical composition of one particular end-user experience. There should be one Preselection Box for each available preselection in the media presentation.

The mandatory Preselection Header Box contains the required references to all tracks constituting to the preselection. Additionally, the box provides identifiers usable for selection processes.

Properties of the preselection shall be indicated using additional boxes such as the Extended language box or the Kind box. In cases where multiple preselections share the same common properties, the content author should provide appropriate textual descriptions through the Label Box.

Syntax
  aligned (8) class PreselectionBox extends Box ('pres') {
  }

8.18.3 Preselection Header Box

Definition

Box Type: 'prhd'
  Container: Preselection Box ('pres')
  Mandatory: Yes
  Quantity: Exactly one This box specifies the characteristics of a single preselection. Exactly one Preselection Header Box is contained in a Preselection.

The preselection_id and preselection_tag provides an identification of the preselection towards application or the media codec respectively. These can be used for selecting a presentation.

The selection_priority should be used to guide any automated selection process in cases where no other differentiation is provided. Evaluating the order of preselection elements to determine their priorities should be avoided.

Syntax

```
aligned(8) class PreselectionHeaderBox
  extends FullBox('prhd', version, flags){
  if (version == 0) {
    unsigned int(32)    preselection_id;
    unsigned int(32)    preselection_tag;
    unsigned int(8)     selecionPriority;
    unsigned string     order; // options:
                                      "time-ordered",
                                      "fully-ordered"; and
                                      "undefined" (default)
    unsigned int(8)     n_tracks;
    unsigned int(32)    [n_tracks] track_ID;
  }
  Box[ ]; // Boxes describing the user exerience
}
```

Semantics
version is an integer that specifies the version of this box (0 in this specification).
flags is a 24-bit integer with flags; no values are defined yet.
preselection_id is an integer that declares a unique identifier towards external applications.
preselection_tag is an integer that declares an identifier towards the used media codec.
selection_priority is an integer that declares the priority of the preselection in cases where no other differentiation such as through the media language is possible. A lower number indicates a higher priority.
n_tracks is an integer that declares number of tracks required to form the preselection.
track_ID is an array of integers that uniquely identifies track each. The list of all tracks in this array reference through the track_ID values are required for the preselection.

8.18.4 Label and Group Label Box

Definition

Box Type: 'labl'
Container: Preselection Box ('pres') and optionally others
Mandatory: No
Quantity: Zero or more This box can be used to annotate the containing structure with a textual description. The description is intended to be presented to the user in some form of text display, it is not intended for any automated selection processes.

Multiple Boxes can be used to provide the textual description in different languages.

Syntax

```
aligned(8) class LabelBox
    extends Box('labl'){
    template unsigned int(16) label_id = 0;
    string   language
    String   label
}
```

Semantics
label_id is an integer that contains an identifier usable by external applications.
language is a NULL-terminated C string containing an RFC 4646 (BCP 47) compliant language tag string, such as "en-US", "fr-FR", or "zh-CN".
label is a NULL-terminated C string containing the textual description.

Consequently, it may be further proposed to update Table 1 (in the same document ISO 14496-12) with lines highlighted in grey as shown below

TABLE 1

Box types, structure, and cross-reference (Informative)

| | | | | | | |
|---|---|---|---|---|---|---|
| ftyp | | | | * | 4.2.3 | file type and compatibility |
| pdin | | | | | 8.1.3 | progressive download information |
| moov | | | | * | 8.2.1 | container for all the metadata |
| | mvhd | | | * | 8.2.2 | movie header, overall declarations |

TABLE 1-continued

Box types, structure, and cross-reference (Informative)

| | | | | | | |
|---|---|---|---|---|---|---|
| | meta | | | | 8.11.1 | Metadata |
| | trak | | | * | 8.3.1 | container for an individual track or stream |
| | | tkhd | | * | 8.3.2 | track header, overall information about the track |
| | | tref | | | 8.3.3 | track reference container |
| | | trgr | | | 8.3.4 | track grouping indication |
| | | edts | | | 8.6.5 | edit list container |
| | | meta | | | 8.11.1 | Metadata |
| | | mdia | | * | 8.4 | container for the media information in a track |
| | | | mdhd | * | 8.4.2 | media header, overall information about the media |
| | | udta | | | 8.10.1 | user-data |
| | mvex | | | | 8.8.1 | movie extends box |
| | | mehd | | | 8.8.2 | movie extends header box |
| | | trex | | * | 8.8.3 | track extends defaults |
| | | leva | | | 8.8.13 | level assignment |
| | <u>pres</u> | | | | <u>t.b.d.</u> | <u>Preselection</u> |
| | | <u>prhd</u> | | * | <u>t.b.d.</u> | <u>Preselection header</u> |
| | | <u>elng</u> | | | <u>8.4.6</u> | <u>Extended language</u> |
| | | <u>kind</u> | | | <u>8.10.4</u> | <u>Kind</u> |
| | | <u>labl</u> | | | <u>t.b.d.</u> | <u>Label</u> |
| moof | | | | | 8.8.4 | movie fragment |
| | mfhd | | | * | 8.8.5 | movie fragment header |
| | meta | | | | 8.11.1 | Metadata |
| | traf | | | | 8.8.6 | track fragment |
| | | tfhd | | ** | 8.8.7 | track fragment header |
| | | trun | | | 8.8.8 | track fragment run |
| | | sbgp | | | 8.9.2 | sample-to-group |
| | | sgpd | | | 8.9.3 | sample group description |
| | | subs | | | 8.7.7 | sub-sample information |
| | | saiz | | | 8.7.8 | sample auxiliary information sizes |
| | | saio | | | 8.7.9 | sample auxiliary information offsets |
| | | tfdt | | | 8.8.12 | track fragment decode time |
| | | meta | | | 8.11.1 | Metadata |
| mfra | | | | | 8.8.9 | movie fragment random access |
| | tfra | | | | 8.8.10 | track fragment random access |
| | mfro | | | * | 8.8.11 | movie fragment random access offset |
| mdat | | | | | 8.2.2 | media data container |
| free | | | | | 8.1.2 | free space |
| skip | | | | | 8.1.2 | free space |
| | udta | | | | 8.10.1 | user-data |
| | | cprt | | | 8.10.2 | copyright etc. |
| | | tsel | | | 8.10.3 | track selection box |
| | | strk | | | 8.14.3 | sub track box |
| | | | stri | | 8.14.4 | sub track information box |
| | | | strd | | 8.14.5 | sub track definition box |
| | meta | | | | 8.11.1 | metadata |
| | | hdlr | | * | 8.4.3 | handler, declares the metadata (handler) type |
| | | dinf | | | 8.7.1 | data information box, container |
| | | | dref | | 8.7.2 | data reference box, declares source(s) of metadata items |
| | | iloc | | | 8.11.2.3 | item location |
| | | ipro | | | 8.11.5 | item protection |
| | | | sinf | | 8.12.2 | protection scheme information box |
| | | | | frma | 8.12.3 | original format box |
| | | | | schm | 8.12.6 | scheme type box |
| | | | | schi | 8.12.7 | scheme information box |
| | | iinf | | | 8.11.6 | item information |
| | | xml | | | 8.11.2 | XML container |
| | | bxml | | | 8.11.2 | binary XML container |
| | | pitm | | | 8.11.4 | primary item reference |
| | | fiin | | | 8.13.2 | file delivery item information |
| | | | paen | | 8.13.2 | partition entry |
| | | | | fire | 8.13.7 | file reservoir |
| | | | | fpar | 8.13.3 | file partition |
| | | | | fecr | 8.13.4 | FEC reservoir |
| | | | segr | | 8.13.5 | file delivery session group |
| | | | gitn | | 8.13.7 | group id to name |

TABLE 1-continued

Box types, structure, and cross-reference (Informative)

| | | | |
|---|---|---|---|
| | idat | 8.11.11 | item data |
| | iref | 8.11.12 | item reference |
| meco | | | additional metadata container |
| | mere | | metabox relation |
| | | meta | metadata |
| styp | | 8.16.2 | segment type |
| sidx | | 8.16.3 | segment index |
| ssix | | 8.16.4 | subsegment index |
| prft | | 8.16.5 | producer reference time |

Additionally, it may be further proposed to introduce the new Preselection Header Box as Container to some of the already existing Boxes. For instance, it may be prosed to amend the existing Box definition (in the same document ISO 14496-12) as below:

8.4.6 Extended language tag
8.4.6.1 Definition
   Box Type: 'elng'
   Container: Media Box ('mdia'), Preselection Header Box ('prhd')
   Mandatory: No
   Quantity: Zero or one
   [ . . . ]

As noted already, the above-proposed amendment should be understood as merely one possible example of implementation, but certainly not the only one. Even though some specific names of the proposed boxes relating to preselection have been given/proposed above, these boxes might as well be named differently. Likewise, even though the above proposed preselection-related boxes appear to be nested under the 'moov' box, these boxes may certainly be implemented somewhere else, as will be understood and appreciated by the skilled person. In one possible example (but certainly not as a limitation of any kind), these preselection-related boxes may be associated with (e.g., nested under) a so-called 'EntityToGroupBox' in the ISOBMFF, or any other suitable places. Similarly, as will be understood and appreciated by the skilled person, as the standards progress and/or develop, it would be likely that the example table(s) (or elements therein) as well as the example sections mentioned above may have different names and/or (hierarchical) positions. In some possible cases, the above mentioned exemplary table(s) (or parts thereof) and/or sections may even be partly or completely obsolete (outdated), such that the respective preselection-related information may have to be defined elsewhere as will be considered appropriate by then.

Reference is now made to FIG. 6, which schematically illustrates a flow chart of another possible example of a method 6000 of processing a media stream according to embodiments of the present invention. As noted above, the method of FIG. 6 may generally be seen as an alternative (or, in some possible cases, as an addition) to the method of FIG. 5 as described above.

Particularly, the method 6000 may start at step S6100 by receiving a media stream packetized in accordance with a predefined transport format. Similar as above, the media stream may be an audio stream, a video stream, or a combination thereof, such as the media stream 3401 as prepared by the packager 3301 as described with reference to FIG. 3B. The method 6000 may also be performed on a user side, or in other words, in a user (decoding) side environment, which may include, but is not limited to, a TV, a soundbar, a web browser, a media play, a plugin, etc., depending on various implementations. The predefined transport format may be the Base Media File format (or ISOBMFF for short) as specified by ISO/IEC 14496-12 MPEG-4 Part 12 by the ISO, or in any other suitable (transport) format as well. Specifically, the packetized media stream may comprise a plurality of hierarchical boxes each being associated with a respective box type identifier. The plurality of boxes may comprise, among other possibilities, one or more track boxes referencing (or in other words, indicating) respective tracks indicative of media (content) components of the media stream.

Subsequently, in step S6200 the method 6000 may comprise checking (e.g., visiting, cycling through, etc.) the track boxes in the media stream to determine a full (or complete/total) set of preselections that are present in the media stream. In particular, the determination of the full set of preselections may comprise: determining a set of unique pairs of track group identifiers and track group types, and addressing the preselections by respective track group identifiers. As noted above, each preselection is associated with a respective track group, which itself in turn, is identified by a respective pair of a corresponding track group identifier and a corresponding track group type. Thus, the preselections may be addressed (or identified) by the respective track group identifiers associated/linked therewith.

The method 6000 may yet further comprise at step S6300 selecting a preselection among the full set of preselections. In particular, the preselection may be selected based on attributes (e.g., represented as metadata or other suitable forms) of the respective preselection that are included in track group boxes with the same track group identifier.

Subsequently, at step S6400 the method 6000 may comprise determining a set of one or more track boxes contributing to the selected preselection. In particular, the set of one or more track boxes contributing to the (same) preselection may be identified by the presence of a (respective) track group box with the same track group identifier.

In addition, at step S6500 the method 6000 may comprise determining, as one or more tracks contributing to the preselection, tracks that are referenced in each member (element) of the set of one or more track boxes as determined above.

Finally, at step S6600, the method 6000 may comprise providing the one or more tracks for downstream processing in accordance with the preselection. As noted above, the preselection generally refers to a set of media content components that are intended to be consumed jointly, for example by one or more suitable downstream devices (or in some possible cases, referred to sinks), such as a media decoder, a media player, etc. In consequence, depending on various implementations and/or requirements, the downstream processing may comprise, but is not limited to, multiplexing (or re-multiplexing), ordering, merging, decoding, or rendering those contributing tracks, as will be described in more details below.

Configured as above, the proposed method 6000 may generally provide an efficient yet flexible manner for determining/identifying and subsequently signaling tracks within a media stream that are configured to contribute to a specific preselection, thereby enabling further downstream processing of such contributing tracks (e.g., by one or more downstream devices). Particularly, it is to be noted that the method as proposed above in the first aspect generally seeks to provide the relevant information for (all of) the tracks that are configured to contribute to a specific preselection in the preselection-related box, thereby enabling the indexing (or identification) of all contributing tracks efficiently. In this sense, such indexing of the tracks as described in the above method 5000 of FIG. 5 may be seen as some sort of forward (direct) indexing. In contrast, in the method 6000 as shown in FIG. 6, tracks contributing to a specific preselection may be jointly determined by the pair of track group type and track group identifier. More specifically, tracks that have (e.g., contain) a track group box with a particular (e.g., predefined or predetermined) track group type may generally indicate that said tracks contribute to preselections. Further, tracks that have the same track group identifier may generally indicate that those tracks belong (contributing) to the same preselection. In this sense, compared to that as proposed in FIG. 5, such indexing of the tracks as described with reference to FIG. 6 may be seen as some sort of reverse indexing. In any case, similar to FIG. 5, the proposed method 6000 in FIG. 6 may also offer the possibility and capability of signaling information indicative of preselections (and possibly the processing thereof) in a transport layer file (e.g., the ISOBMFF), in a unified manner, which may be considered beneficial in various use cases or scenarios, such as those as described in detail above with references to FIGS. 1A, 2, 3B and 4B.

Notably, similar to FIG. 5, with the aim of implementing the proposed method 6000 as described above with regard to FIG. 6, particularly for supporting preselection within the context of ISOBMFF, in some possible implementations, it may be generally proposed to amend (create, or replace) ISO 14496-12 with the following text (alternatively or in addition to those as proposed with reference to FIG. 5):

3.1 Terms and Definitions 3.1.x Preselection
A set of one or multiple media components representing one version of the media presentation that may be selected by a user for simultaneous decoding/presentation.
3.1.y Media Component
It may be generally proposed to amend ISO 14496-12, section 8.3.4.3 with the following lines in grey:
 track_group_type indicates the grouping_type and shall be set to one of the following values, or a value registered, or a value from a derived specification or registration:
  'msrc' indicates that this track belongs to a multi-source presentation. Specified in 8.3.4.4.1.
  'ster' indicates that this track is either the left or right view of a stereo pair suitable for playback on a stereoscopic display. Specified in 02.
  pres' indicates that this track contributes to a preselection. Specified in 8.3.4.4.3
The pair of track_group_id and track_group_type identifies a track group within the file. The tracks that contain a particular TrackGroupTypeBox having the same value of track_group_id and track_group_type belong to the same track group.

It may be generally proposed to amend (or create) ISO 14496-12, section 8.3.4.4.3 with the following lines in grey:
8.3.4.1.3 Preselection Box 8.3.4.1.3.1 Definition TrackGroupTypeBox with track_group_type equal to 'pres' indicates that this track contributes to a preselection.
The tracks that have the same value of track_group_id within
PreselectionGroupBox are part of the same preselection.

Preselections can be qualified by language, kind or media specific attributes like audio rendering indications or channel layouts. Attributes signaled in a preselection box shall take precedence over attributes signaled in contributing tracks.

All attributes uniquely qualifying a preselection shall be present in at least one Preselection Box of the preselection. If present in more than one Preselection Box of the preselection, the boxes shall be identical.

Note: Preselections group tracks of the same media type only.

Tracks not containing all required media components for at least one preselection shall have the track_in_movie flag set to '0' in their Track Header Boxes. This prevents players not understanding the Preselection Box from playing the track resulting in an incomplete experience.

Note: It is good practice to have one track with track_in_movie flag set to one. This implies that this track provides at least one complete experience.

8.3.4.1.3.2 Syntax

```
aligned(8) class PreselectionGroupBox extends TrackGroupTypeBox('pres')
{
    if (flags & 1) {
        unsigned int(8)    selectionPriority=1
    }
    if (flags & 2) {
        unsigned int(8)    order=0
    }
    PreselectionInformationBox( )
    PreselectionProcessingBox( )
}
```

8.3.4.1.3.3 Semantics
 selection_priority is an integer that declares the priority of the preselection in cases where no other differentiation such as through the media language is possible. A lower number indicates a higher priority.
 order specifies the conformance rules for Representations in Adaptation Sets within the Preselection according to [MPEG-DASH], from the following enumerated set:
  0: undefined
  1: time-ordered
  2: fully-ordered
8.3.4.1.3.4 Preselection Information Box 8.3.4.1.3.4.1 Definition Box Type: 'prsi'

Container: Preselection Box

Mandatory: Yes

Quantity: Exactly One

This Box aggregates all semantic information about the preselection.

8.3.4.1.3.4.2 Syntax

```
aligned(8) class PreselectionInformationBox
    extends FullBox('prsi', version=0, 0 ){
    // Boxes describing the preselection
}
```

8.3.4.1.3.4.3 Semantics
8.3.4.1.3.4.5 Preselection Processing Box

8.3.4.1.3.4.5.1 Definition

Box Type: 'prsp'
Container: Preselection Box
Mandatory: Yes
Exactly One Quantity:
This box contains information how the tracks contributing to the preselection shall be processed. Media type specific boxes may be used to describe further processing.
8.3.4.1.3.4.5.2 Syntax

```
aligned(8) class PreselectionProcessingBox
    extends FullBox('prsp', version=0, 0 ){
    string preselection_tag;
    unsigned int(8) track_order
    unsigned int(1) sample_merge_flag
    unsigned int(7) reserved
    // Boxes defining additional processing of
    // the track contributing to the preselection
}
```

8.3.4.1.3.4.5.3 Semantics
preselection_tag is an integer that contains an identifier for the label. Labels with the same value belong to a label group. The default value of zero indicates that the label does not belong to any label group.

track_order defines in which order the tracks shall be provided to decoders. Tracks with lower track_order shall be provided to the decoder first. If multiple tracks have the same value of track_order, the order is not relevant.

sample_merge_flag: if this flag is set to '1', each sample of this track shall be appended to the sample of the track with the next lower track_order value. If set to '0', this track shall be provided to a separated decoder instance.

In may be further proposed to create (or amend, or replace) ISO 14496-12, section 8.18.4 as follows:
8.18.4 Label and Group Label Box

Definition

Box Type: 'labl'
Container: Container User data box ('udta') in a track, Preselection Box ('pres')
Mandatory: No
Quantity: Zero or more
Labels provide the ability to annotate data structures in an ISOBMFF file to provide a description of the context of the element to which the label is assigned. Such labels may for example be used by playback clients to provide a selection choice to the user. The label may also be used for simple annotation in another context.

In addition, a GroupLabel element may be added on a higher level in order to provide a summary or title of the labels collected in a group. An example may be that this is used in a menu in order to provide a context of the menu of the labels.

Multiple Labels can be used to provide the textual description. To annotate the preselection to a multilingual audience, the annotation can be provided in a language different from that of the preselection.

If the is_group_label is set to a value different from zero, the label text in this box specifies a summary or title of all labels with the same label_id. This may be used as the title on a selection menu containing a collection of labels.

Syntax

```
aligned(8) class LabelBox
    extends FullBox('labl', version=0, 0 ){
    unsigned int(8)    is_group_label = 0;
    unsigned int(16)   label_id = 0;
    utf8string   language;
    utf8string   label;
}
```

Semantics
is_group_label specifies if the label contains a summary label for a group of labels.

label_id is an integer that contains an identifier for the label. Labels with the same value belong to a label group. The default value of zero indicates that the label does not belong to any label group.

language is a NULL-terminated C string containing an RFC 4646 (BCP 47) compliant language tag string, such as "en-US", "fr-FR", or "zh-CN", the language being the language the label is targeted at.

label is a NULL-terminated C string containing the textual description.

It may be further proposed to create (or amend, or replace) ISO 14496-12, section 8.18.4 as follows:
8.18.5 Audio Rendering Indication Box

Definition

Box Type: 'ardi'
Container: Preselection Box ('pres')
Mandatory: No
Quantity: Zero or one
The audio rendering indication box contains a hint for a preferred reproduction channel layout.
Syntax

```
aligned(8) class AudioRenderingIndicationBox
    extends FullBox('ardi', version=0, 0 ){
    unsigned int(8)   audio_rendering_indication = 0;
}
```

Semantics
audio_rendering_indication contains a hint for a preferred reproduction channel layout, coded according to Table 2.

TABLE 1

Coding of audio rendering indication

| audio_rendering_indication | Description |
|---|---|
| 0 | no preference given for the reproduction channel layout |
| 1 | preferred reproduction channel layout is stereo |
| 2 | preferred reproduction channel layout is two-dimensional (e.g. 5.1 multi-channel) |
| 3 | preferred reproduction channel layout is three-dimensional |
| 4 | content is pre-rendered for consumption with headphones |
| 5 to 255 | reserved for future use |

Notably, based on the newly proposed preselection-related boxes as illustrated above, it may be further proposed to the above Table 1 as described with reference to FIG. 5, as will be understood and appreciated by the skilled person, such that details thereof are not repeated for the sake of conciseness.

Additionally, it may be further proposed to introduce the new Preselection Header Box as Container to some of the already existing Boxes. For instance, it may be prosed to amend the existing Box definition by the text highlighted in grey:

8.4.6 Extended Language Tag 8.4.6.1 Definition

Box Type: 'elng'
Container: Media Box ('mdia'), Preselection Box ('pres'
Mandatory: No
Quantity: Zero or one
[ . . . ]
8.10.1 User Data Box 8.10.4.1 Definition Box Type: 'udta'
Container: MovieBox, TrackBox, MovieFragmentBox er TrackFragmentBox or PreselectionBox
Mandatory: No
Quantity: Zero or one
[ . . . ]
8.10.4 Track Kind 8.10.4.1 Definition Box Type: 'kind'
Container: Container User data box ('udta') in a track or a Preselection Box ('pres')
Mandatory: No
Quantity: Zero or one
12.2.4 Channel Layout 8.10.4.1 Definition Box Type: 'chnl'
Container: Audio sample entry or Preselection Box
Mandatory: No
Quantity: Zero or one
[ . . . ]

Again, as has been noted, the above-proposed amendment described with reference to the method of FIG. 6 should be understood as merely one possible example of implementation, but certainly not the only one. Even though some specific names of the proposed boxes relating to preselection have been given/proposed above, these boxes might as well be named differently. Likewise, even though in the above proposed preselection-related boxes appear to be associated with some specific box, these boxes may certainly be implemented somewhere else, as will be understood and appreciated by the skilled person.

Figure 7:
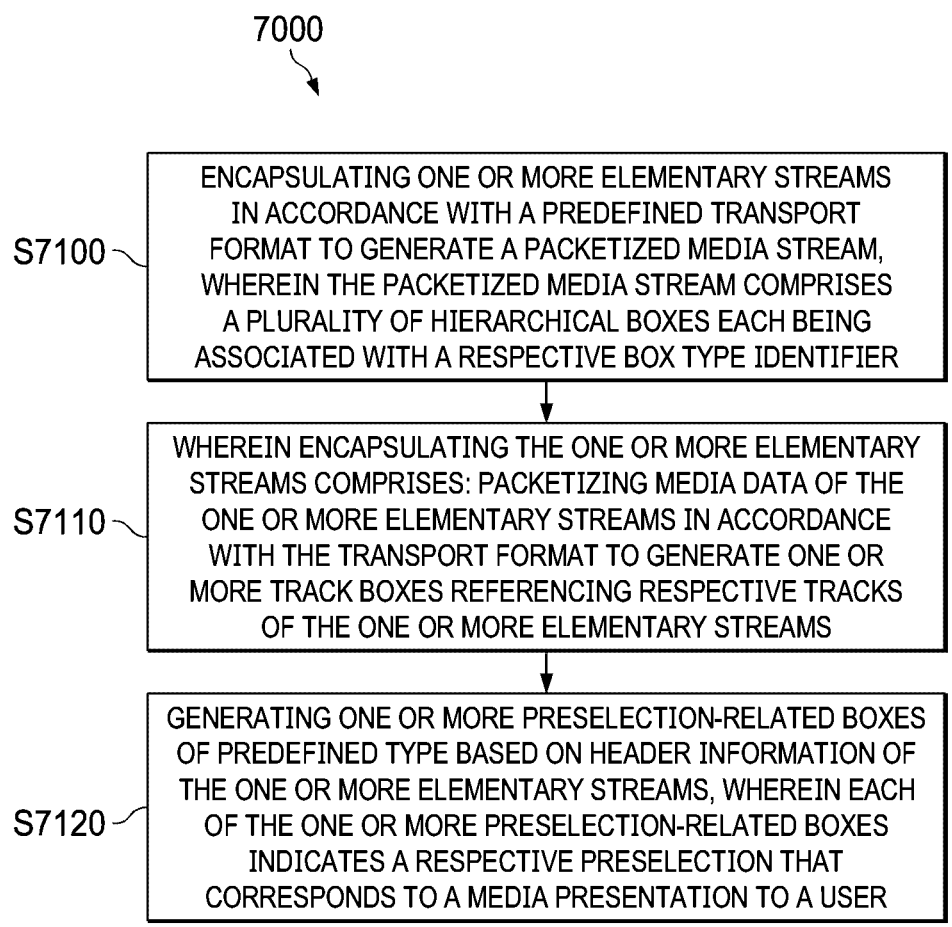
FIG. 7 is a schematic flowchart illustrating a further example of a method of processing a media stream according to embodiments of the present disclosure.

Now referring to FIG. 7, which schematically illustrates an example flowchart of a method 7000 of processing a media stream according to embodiments of the present invention. Similar to above, the media stream may be an audio stream, a video stream, or a combination thereof. Notably, the method 7000 may be performed on an encoding side environment (e.g., a media encoder). In some scenarios (or use cases), such encoder may also be referred to as a (media) packager (i.e., being configured to pack/packetize the media inputs) as exemplified as 2300-A-C in FIG. 2 or as 3301 in FIG. 3B.

In particular, the method 7000 may comprise at step S7100 encapsulating one or more elementary streams in accordance with a predefined transport format to generate a packetized media stream, wherein the packetized media stream comprises a plurality of hierarchical boxes each being associated with a respective box type identifier. Similar to above, the predefined transport format may be the Base Media File format (or ISOBMFF for short) as specified by ISO/IEC 14496-12 MPEG-4 Part 12 by the ISO, or in any other suitable (transport) format.

More particularly, the step S7100 of encapsulating the one or more elementary streams may comprise: at step S7110, packetizing media data of the one or more elementary streams in accordance with the transport format to generate one or more track boxes referencing (or indicating) respective tracks of the one or more elementary streams; and at step S7120 generating one or more preselection-related boxes of predefined type based on header information of the one or more elementary streams, wherein each of the one or more preselection-related boxes indicates a respective preselection that corresponds to a media presentation to a user.

Configured as described above, the proposed method may generally provide an efficient yet flexible manner for packetizing the media input (e.g., elementary streams) in accordance with a predefined transport format (e.g., the ISOBMFF). More particularly, by generating and including one or more preselection-related boxes (each of which being indicative of a respective preselection) alongside the packetized media stream, the proposed method may also enable to represent the preselections in a unified manner being agnostic to the codecs, thereby further enabling appropriate downstream processing of the tracks contributing to the corresponding preselection (e.g., according to the methods as proposed in the preceding first and second aspects). In addition, as illustrated above, such unified representation of preselections may also enable format-agnostic implementation of preselection data handling in manifest (e.g., a MPEG Dynamic Adaptive Streaming over HTTP, DASH, format file, or an HTTP Live Stream, HLS, format file) generators, thereby avoiding the need for computational more expensive operations on binary data, and at the same time, with reduced implementation effort and increased reliability.

Figure 8:
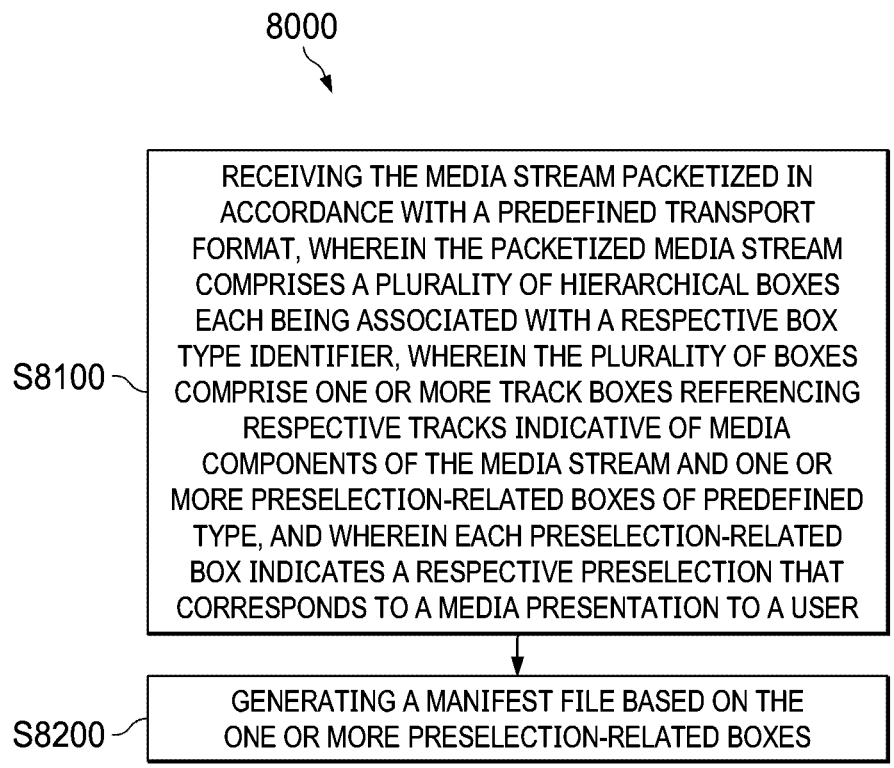
FIG. 8 is a schematic flowchart illustrating yet another example of a method of processing a media stream according to embodiments of the present disclosure.

FIG. 8 is a schematic flowchart illustrating yet another example of a method 8000 of processing a media stream according to embodiments of the present invention. The media stream may be an audio stream, a video stream, or a combination thereof. The method 8000 may be performed by a manifest generator, for example, the manifest generator as exemplified as 2500 in FIG. 2 or as 4501 in FIG. 4B.

In particular, the method 8000 may comprise, at step S8100, receiving the media stream packetized in accordance with a predefined transport format. More particularly, the packetized media stream may comprise a plurality of hierarchical boxes each being associated with a respective box type identifier, wherein the plurality of boxes may comprise one or more track boxes referencing (e.g., indicating) respective tracks indicative of media components of the media stream and one or more preselection-related boxes of a predefined type, and wherein each preselection-related box indicates a respective preselection that corresponds to a media presentation to a user.

Further, the method 8000 may also comprise, at step S8200, generating a manifest file based on the one or more preselection-related boxes.

Configured as described above, the proposed method may generally provide an efficient yet flexible manner for generating a manifest file by taking the preselection related information (e.g., descriptive information and/or processing related information) also into account. More particularly, aside from information relating to the media stream(s), the proposed method may further include information associated with preselections. The preselection related information may comprise but is not limited to, metadata information, processing information, or the like. Compared with conventional (manifest generation) techniques, the proposed method for the generation of the manifest file may generally offer a format agnostic implementation for the preselection related data handling, thereby avoiding computational more expensive operations (e.g., those have to be performed on binary data in conventional techniques), reducing implementation and/or testing effort, and increasing reliability.

To summarize, the methods proposed and described above with reference to the drawings generally relate to techniques for processing media streams by taking "preselection" into account. Such "preselection"-aware techniques may enable various potential use cases. One possible use case may include, as mentioned above, selecting amongst several languages (subtitles).

Another possible example use case may relate to narrative importance. Specifically, to possibly address the needs of people with hearing impairments, or to possibly adapt audio compositions to different listening conditions, there may be a need for techniques such as dialog enhancement, which, generally speaking, may be used to improve the ratio of dialogue level vs. background level. As an extension of such dialog enhancement technique, additional measures have been proposed to selectively and progressively drop entire audio elements from compositions, to improve dialogue intelligibility. In such cases, it is possible to map a continuum of "full material" through "dialogue only" into a number of preselections, and to use the methods of the present disclosure.

A further conceivable use case may relate to audience targeting. To be more specific, sometimes it may be of interest to target a specific audience beyond language. As an example (but not as a limitation of any kind), two sports match commentators might be provided that are biased for either team, respectively. In this case, different preselections may include or reference different sports match commentators.

Yet a further preselection-related use case may relate to playback environment adaptation. That is, content creators might generate dedicated versions targeting different reproduction environments such as home-cinema setups compared to built-in speakers of TVs or a headphone version. In this case, different preselections may relate to different audio for the different reproduction environments.

Figure 9:
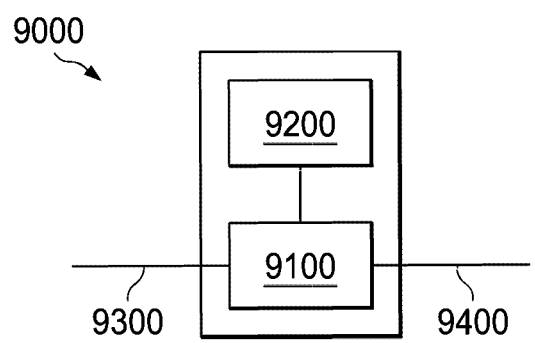
FIG. 9 is a schematic block diagram of an example apparatus for performing methods according to embodiments of the present disclosure.

Finally, the present invention likewise relates to apparatus(es) for performing methods and techniques described throughout the present disclosure. FIG. 9 generally shows an example of such apparatus 9000. In particular, the apparatus 9000 comprises a processor 9100 and a memory 9200 coupled to the processor 9100. The memory 9200 may store instructions for the processor 9100. The processor 9100 may also receive, among others, input data (e.g., media input, packetized media streams, etc.), depending on various use cases and/or implementations. The processor 9100 may be adapted to carry out the methods/techniques (e.g., the methods 5000, 6000, 7000 and 8000 as illustrated above) described throughout the present disclosure and to generate correspondingly output data 9400 (e.g., packetized media streams, manifest files, etc.), depending on various use cases and/or implementations. For instance, the apparatus 9000 may, depending on circumstances, implement a packager configured for carrying out the method 7000 of processing a media stream as illustrated above with respect to FIG. 7; or implement a manifest generator configured for carrying out the method 8000 of processing a media stream as illustrated above with respect to FIG. 8, according to embodiments of the present invention.

Interpretation

A computing device implementing the techniques described above can have the following example architecture. Other architectures are possible, including architectures with more or fewer components. In some implementations, the example architecture includes one or more processors (e.g., dual-core Intel® Xeon® Processors), one or more output devices (e.g., LCD), one or more network interfaces, one or more input devices (e.g., mouse, keyboard, touch-sensitive display) and one or more computer-readable mediums (e.g., RAM, ROM, SDRAM, hard disk, optical disk, flash memory, etc.). These components can exchange communications and data over one or more communication channels (e.g., buses), which can utilize various hardware and software for facilitating the transfer of data and control signals between components.

The term "computer-readable medium" refers to a medium that participates in providing instructions to processor for execution, including without limitation, non-volatile media (e.g., optical or magnetic disks), volatile media (e.g., memory) and transmission media. Transmission media includes, without limitation, coaxial cables, copper wire and fiber optics.

Computer-readable medium can further include operating system (e.g., a Linux® operating system), network communication module, audio interface manager, audio processing manager and live content distributor. Operating system can be multi-user, multiprocessing, multitasking, multithreading, real time, etc. Operating system performs basic tasks, including but not limited to: recognizing input from and providing output to network interfaces and/or devices; keeping track and managing files and directories on computer-readable mediums (e.g., memory or a storage device); controlling peripheral devices; and managing traffic on the one or more communication channels. Network communications module includes various components for establishing and maintaining network connections (e.g., software for implementing communication protocols, such as TCP/IP, HTTP, etc.).

Architecture can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Unless specifically stated otherwise, as apparent from the following discussions, it is appreciated that throughout the present invention discussions utilizing terms such as "processing", "computing", "calculating", "determining", "analyzing" or the like, refer to the action and/or processes of a computer or computing system, or similar electronic computing devices, that manipulate and/or transform data represented as physical, such as electronic, quantities into other data similarly represented as physical quantities.

Reference throughout this invention to "one example embodiment", "some example embodiments" or "an example embodiment" means that a particular feature, structure or characteristic described in connection with the example embodiment is included in at least one example embodiment of the present invention. Thus, appearances of the phrases "in one example embodiment", "in some example embodiments" or "in an example embodiment" in various places throughout this invention are not necessarily all referring to the same example embodiment. Furthermore, the particular features, structures or characteristics may be combined in any suitable manner, as would be apparent to one of ordinary skill in the art from this invention, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the present invention, various features of the present invention are sometimes grouped together in a single example embodiment, FIG., or description thereof for the purpose of streamlining the present invention and aiding in the understanding of one or more of the various inventive aspects. This method of invention, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this invention.

Furthermore, while some example embodiments described herein include some but not other features included in other example embodiments, combinations of features of different example embodiments are meant to be within the scope of the present invention, and form different example embodiments, as would be understood by those skilled in the art. For example, in the following claims, any of the claimed example embodiments can be used in any combination.

In the description provided herein, numerous specific details are set forth. However, it is understood that example embodiments of the present invention may be practiced without these specific details. In other instances, well-known methods, structures and techniques have not been shown in detail in order not to obscure an understanding of this description.

Thus, while there has been described what are believed to be the best modes of the present invention, those skilled in the art will recognize that other and further modifications may be made thereto without departing from the spirit of the present invention, and it is intended to claim all such changes and modifications as fall within the scope of the present invention. For example, any formulas given above are merely representative of procedures that may be used.

Functionality may be added or deleted from the block diagrams and operations may be interchanged among functional blocks. Steps may be added or deleted to methods described within the scope of the present disclosure.

Enumerated example embodiments ("EEEs") of the present disclosure have been described above in relation to methods and systems for determining an indication of an audio quality of an audio input. Thus, an embodiment of the present invention may relate to one or more of the examples, enumerated below:

EEE 1. A method for decoding an encoded media bitstream in a multiplexed format, the multiplexed format including a preselection box for a listing of versions with properties of said versions, the preselection box being agnostic of the encoded media format:
　determining from the preselection box the listing of versions with properties for a selection method;
　decoding the encoded media bitstream based on the selection method in order to output a playable audio version.

EEE 2. A method according to EEE 1 where the selection method is an UI exposed to the end user visualizing the versions and properties for performing an instant choice.

EEE 3. A method according to EEE 1 where the selection method is an automatic process based on user preference settings.

EEE 4. A method according to EEE 1 where the selection method is an automatic process based on information about the end-device, the playback geographical region or other data characteristics.

EEE 5. A method according to any one of EEEs 1 to 4 where the multiplexed format is ISOBMFF, transport stream, or MXF.

EEE 6. A method according to EEE 5 wherein the media bitstream includes an encrypted media payload, and wherein the encoding format is in cleartext.

EEE 7. A method according to any one of EEEs 1 to 4, wherein the method of decoding is used for a specialized playback architecture, specialized type of media or specialized preselections for audio, video and virtual reality.

EEE 8. A method according to any one of EEEs 1 to 4, wherein the multiplexed format includes information regarding a pre-downloaded user choice.

EEE 9. A method for packaging encoded media assets for transmission where the transmission format encompasses a manifest file listing the assets, the method comprising:
　packaging the manifest file, wherein the manifest file encompasses a listing of available versions and their properties to be derived from either a single stream or a multi-stream assets, and wherein said listing can be derived from the assets without accessing codec specific information.

EEE 10. A method according to EEE 9 where the manifest file is in an MPEG DASH, HLS, or SDP format.

EEE 11. A method of processing a media stream, comprising:
　receiving the media stream packetized in accordance with a predefined transport format, wherein the packetized media stream comprises a plurality of hierarchical boxes each being associated with a respective box type identifier, wherein the plurality of boxes comprise one or more track boxes referencing tracks indicative of media components of the media stream and one or more track group boxes each being associated with a respective track group identifier and a respective track group type that jointly identify a respective track group within the media stream, and wherein tracks having the same track group identifier and the same track group type belong to the same track group; and where each such track group determines a preselection;
　visiting all track boxes in the media stream to determine the total set of preselections;
　wherein the determination is made by determining the set of all unique pairs of track group identifiers and track group types and addressing the preselections by track group identifier;
　selecting a preselection based on the attributes of the preselection found in all track group boxes with the same track group identifier;
　determining a set of one or more track boxes contributing to the preselection as identified by the presence of a track group box with the same track group identifier; and
　determining the contributing tracks as referenced in each member of the set of track boxes.

The invention claimed is:

1. A method of processing a media stream, comprising:
   receiving the media stream packetized in accordance with a predefined transport format, wherein the packetized media stream comprises a plurality of hierarchical boxes each being associated with a respective box type identifier, and wherein the plurality of boxes comprise one or more track boxes referencing respective tracks indicative of media components of the media stream;
   determining whether the media stream comprises a preselection-related box of predefined type indicative of a preselection, wherein the preselection corresponds to a media presentation to a user; and
   if it is determined that the media stream comprises the preselection-related box:
      analyzing metadata information corresponding to the preselection-related box, the metadata information being indicative of characteristics of the preselection;
      identifying one or more tracks in the packetized media stream contributing to the preselection based on the metadata information; and
      providing the one or more tracks for downstream processing in accordance with the given preselection,
   wherein the media stream further comprises processing information indicative of how tracks contributing to the preselection are to be processed;
   wherein the processing information comprises ordering information indicative of a track order for processing the one or more tracks;
   wherein the processing information comprises merging information indicative of whether one or more tracks are to be merged with one or more other tracks for joint processing;
   wherein the method further comprises:
   merging the one or more tracks in accordance with the merging information and the ordering information;
   wherein the ordering information comprises, for each track contributing to the preselection, a respective track order value for defining the track order of the tracks;
   wherein the merging information comprises a respective merge flag for each track contributing to the preselection, wherein a first setting value of the merge flag indicates that the respective track is to be merged with an adjoining track in the track order, and a second setting value of the merge flag indicates that the respective track is to be processed separately; and
   wherein merging the one or more tracks in accordance with the merging information and the ordering information comprises:
   successively scanning the tracks in accordance with the track order; and
   merging tracks in accordance with respective merge flags.

2. The method according to claim 1, further comprising:
   decoding the one or more tracks for playback of the media stream according to the media presentation indicated by the preselection.

3. The method according claim 2, wherein the one or more tracks are decoded by a downstream device.

4. The method according to claim 2, wherein merging the one or more tracks and decoding the one or more tracks are performed by one single device.

5. The method according to claim 1, wherein the media stream comprises a plurality of preselection-related boxes of the predefined type, and wherein the method further comprises selecting the preselection-related box among the plurality of preselection-related boxes.

6. The method according to claim 5, wherein the preselection-related box is selected by an application.

7. The method according to claim 5, wherein the media stream comprises one or more label boxes each comprising descriptive information for a respective media presentation to the user corresponding to a respective preselection; and
   wherein the selection of the preselection-related box is based on an input of the user.

8. The method according to claim 1, wherein the preselection-related box is agnostic to a media codec used for encoding the media stream before being packetized.

9. The method according to claim 1, wherein the metadata information corresponding to the preselection-related box comprises track identification information indicative of one or more track identifiers each being associated with a respective track, wherein tracks associated with the one or more track identifiers in the metadata information relate to the media presentation.

10. The method according to claim 1, wherein the metadata information corresponding to the preselection-related box comprises preselection identification information indicative of a preselection identifier for identifying the preselection.

11. The method according to claim 1, wherein the metadata information corresponding to the preselection-related box comprises unique preselection-specific data for configuring a downstream device for decoding the tracks in accordance with the preselection.

12. The method according to claim 1, where the media stream comprises at least one of an audio stream, or a video stream.

13. A method of processing a media stream, comprising:
   receiving the media stream packetized in accordance with a predefined transport format, wherein the packetized media stream comprises a plurality of hierarchical boxes each being associated with a respective box type identifier, wherein the plurality of boxes comprise one or more track boxes referencing respective tracks indicative of media components of the media stream and one or more track group boxes each being associated with a respective pair of a track group identifier and a track group type that jointly identify a respective track group within the media stream, wherein tracks having the same track group identifier and the same track group type belong to the same track group; and wherein each such track group determines a preselection corresponding to a media presentation to a user;
   checking the track boxes in the media stream to determine a full set of preselections that are present in the media stream, wherein the determination of the full set of preselections comprises: determining a set of unique pairs of track group identifiers and track group types, and addressing the preselections by respective track group identifiers;
   selecting a preselection among the full set of preselections, wherein the preselection is selected based on attributes of the respective preselection that are included in track group boxes with the same track group identifier;
   determining a set of one or more track boxes contributing to the selected preselection, wherein the set of one or more track boxes contributing to the preselection is identified by the presence of a track group box with the same track group identifier;

determining, as one or more tracks contributing to the preselection, tracks that are referenced in each member of the set of one or more track boxes; and providing the one or more tracks for downstream processing in accordance with the preselection, wherein each preselection is associated with a respective preselection-related box of predefined type, and wherein the preselection-related box instantiates a track group box with a predefined track group type relating to preselection;

wherein the preselection-related box is associated with a preselection processing box comprising processing information indicative of how tracks contributing to the preselection are to be processed;

wherein the processing information comprises ordering information indicative of a track order for ordering the tracks;

wherein the processing information comprises merging information indicative of whether the track is to be merged with one or more other tracks;

wherein the method further comprises:

merging the tracks in accordance with the merging information and the ordering information;

wherein the ordering information comprises a track order value for defining the track order of the tracks;

wherein the merging information comprises a merge flag, wherein a first setting value of the merge flag indicates that the track is to be merged with an adjoining track in the track order, and a second setting value of the merge flag indicates that the track is to be processed separately; and wherein merging the one or more tracks in accordance with the merging information and the ordering information comprises:

successively scanning the tracks in accordance with the track order; and merging tracks in accordance with respective merge flags.

14. The method according to claim 13, wherein the preselection-related box is associated with a preselection information box comprising semantic information indicative of the preselection.

15. The method according to claim 13, wherein the processing information comprises unique preselection-specific data for configuring a downstream device for decoding the tracks in accordance with the preselection.

16. The method according to claim 13, further comprising:

decoding the tracks for playback of the media stream according to the media presentation indicated by the preselection.

17. The method according to claim 16, wherein the one or more tracks are decoded by a downstream device.

18. The method according to claim 16, wherein merging and decoding the tracks are performed by one single device.

19. The method according to claim 13, wherein the preselection is determined by an application.

20. The method according to claim 13, wherein the media stream comprises one or more label boxes each being linked to a respective preselection information box of a respective preselection, and wherein each label box comprises descriptive information for a respective media presentation to the user; and wherein the determination of the preselection is based on an input of the user.

21. A method of processing a media stream, comprising:

encapsulating one or more elementary streams in accordance with a predefined transport format to generate a packetized media stream, wherein the packetized media stream comprises a plurality of hierarchical boxes each being associated with a respective box type identifier; and wherein encapsulating the one or more elementary streams comprises:

packetizing media data of the one or more elementary streams in accordance with the transport format to generate one or more track boxes referencing respective tracks of the one or more elementary streams;

generating one or more preselection-related boxes of predefined type based on header information of the one or more elementary streams, wherein each of the one or more preselection-related boxes indicates a respective preselection that corresponds to a media presentation to a user; and generating one or more preselection processing boxes comprising processing information indicative of how tracks contributing to a respective preselection are to be processed, wherein the processing information comprises ordering information indicative of a track order for processing the one or more tracks;

wherein the processing information comprises merging information indicative of whether one or more tracks are to be merged with one or more other tracks for joint processing;

wherein the ordering information comprises, for each track contributing to the preselection, a respective track order value for defining the track order of the tracks; and wherein the merging information comprises a respective merge flag for each track contributing to the preselection, wherein a first setting value of the merge flag indicates that the respective track is to be merged with an adjoining track in the track order, and a second setting value of the merge flag indicates that the respective track is to be processed separately.

22. A method of processing a media stream, comprising:

receiving the media stream packetized in accordance with a predefined transport format, wherein the packetized media stream comprises a plurality of hierarchical boxes each being associated with a respective box type identifier, wherein the plurality of boxes comprise one or more track boxes referencing respective tracks indicative of media components of the media stream and one or more preselection-related boxes of predefined type, and wherein each preselection-related box indicates a respective preselection that corresponds to a media presentation to a user; and generating a manifest file based on the one or more preselection-related boxes, wherein the media stream further comprises processing information indicative of how tracks contributing to the preselection are to be processed;

wherein the processing information comprises ordering information indicative of a track order for processing the one or more tracks;

wherein the processing information comprises merging information indicative of whether one or more tracks are to be merged with one or more other tracks for joint processing;

wherein the ordering information comprises, for each track contributing to the preselection, a respective track order value for defining the track order of the tracks; and wherein the merging information comprises a respective merge flag for each track contributing to the preselection, wherein a first setting value of the merge flag indicates that the respective track is to be merged with an adjoining track in the track order, and a second setting value of the merge flag indicates that the respective track is to be processed separately.

\* \* \* \* \*